United States Patent
Hu et al.

(10) Patent No.: US 11,625,254 B1
(45) Date of Patent: Apr. 11, 2023

(54) INTERFACE FOR CUSTOMIZING DASHBOARDS BASED ON PARALLEL EDGES

(71) Applicant: Splunk Inc., San Francisco, CA (US)

(72) Inventors: Xianlin Hu, Santa Clara, CA (US); Yuxiang Kou, Foster City, CA (US); Peter Peterson, Santa Clara, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/470,609

(22) Filed: Sep. 9, 2021

Related U.S. Application Data

(63) Continuation of application No. 17/086,093, filed on Oct. 30, 2020, now Pat. No. 11,144,336.

(60) Provisional application No. 63/093,056, filed on Oct. 16, 2020.

(51) Int. Cl.
*G06F 9/451* (2018.01)

(52) U.S. Cl.
CPC .................................. *G06F 9/451* (2018.02)

(58) Field of Classification Search
CPC .................................................... G06F 9/451
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,933,925 B2* | 4/2018 | Hertzog | G06F 3/0482 |
| 10,127,258 B2 | 11/2018 | Lamas et al. | |
| 10,838,594 B2* | 11/2020 | Bandea | G06F 3/0484 |
| 2006/0256084 A1 | 11/2006 | Hey et al. | |
| 2008/0109740 A1 | 5/2008 | Prinsen et al. | |
| 2009/0106656 A1* | 4/2009 | Handy | G06F 16/906 |
| | | | 715/709 |
| 2010/0235771 A1 | 9/2010 | Gregg, III | |
| 2010/0324870 A1 | 12/2010 | Beckman et al. | |
| 2011/0307793 A1 | 12/2011 | Leitner et al. | |

(Continued)

OTHER PUBLICATIONS

Splunk Enterprise 8.0.0 Overview, available online, retrieved May 20, 2020 from docs.splunk.com.

(Continued)

*Primary Examiner* — Tadesse Hailu
(74) *Attorney, Agent, or Firm* — Ferguson Braswell Fraser Kubasta PC

(57) ABSTRACT

An interface for customizing dashboards based on parallel edges includes functionality for detecting an edge dragging event of a selected edge in a dashboard, the edge dragging event including dragging the selected edge along an axis perpendicular to the edge, and identifying a parallel edge to the selected edge, the parallel edge within a threshold distance to the selected edge along the axis. The interface further includes functionality for setting the edge dragging event to make the selected edge be collinear with the parallel edge based on the parallel edge being within the threshold (Continued)

distance to the selected edge, and stopping the edge dragging event at a stop location to generate an updated dashboard. The interface further includes functionality for presenting the updated dashboard.

19 Claims, 31 Drawing Sheets

(56) References Cited

U.S. PATENT DOCUMENTS

| | | | | |
|---|---|---|---|---|
| 2014/0129969 | A1* | 5/2014 | Chasman | G06F 3/0482 |
| | | | | 715/769 |
| 2015/0212663 | A1 | 7/2015 | Papale et al. | |
| 2015/0212714 | A1 | 7/2015 | Hua et al. | |
| 2015/0212717 | A1* | 7/2015 | Nair | G06F 9/451 |
| | | | | 715/769 |
| 2016/0092084 | A1* | 3/2016 | Dyar | G06F 3/0484 |
| | | | | 715/765 |
| 2016/0103559 | A1 | 4/2016 | Maheshwari et al. | |
| 2016/0103883 | A1 | 4/2016 | Ramani et al. | |
| 2017/0083572 | A1 | 3/2017 | Tankersley et al. | |
| 2017/0147681 | A1 | 5/2017 | Tankersley et al. | |
| 2017/0220633 | A1* | 8/2017 | Porath | G06F 16/248 |
| 2018/0300020 | A1* | 10/2018 | Dyar | G06F 9/451 |
| 2019/0098106 | A1 | 3/2019 | Mungel et al. | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pds/solution-guides/splunk-quick-reference-guide.pdf, retrieved May 20, 2020.

Carasso, David, "Exploring Splunk" published by CITO Research, New York, NY, Apr. 2012 (156 pages).

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Vaid, K., "QPS,KW-hr,MTBF,DT,PUE,IOPS,DB/RH: A Day in the Life of a Datacenter Architect", Workshop on Managing Systems via Log Analysis and Machine Learning Techniques (SLAML '10) Vancouver, BC, Canada, Oct. 3, 2010 (7 pages).

* cited by examiner

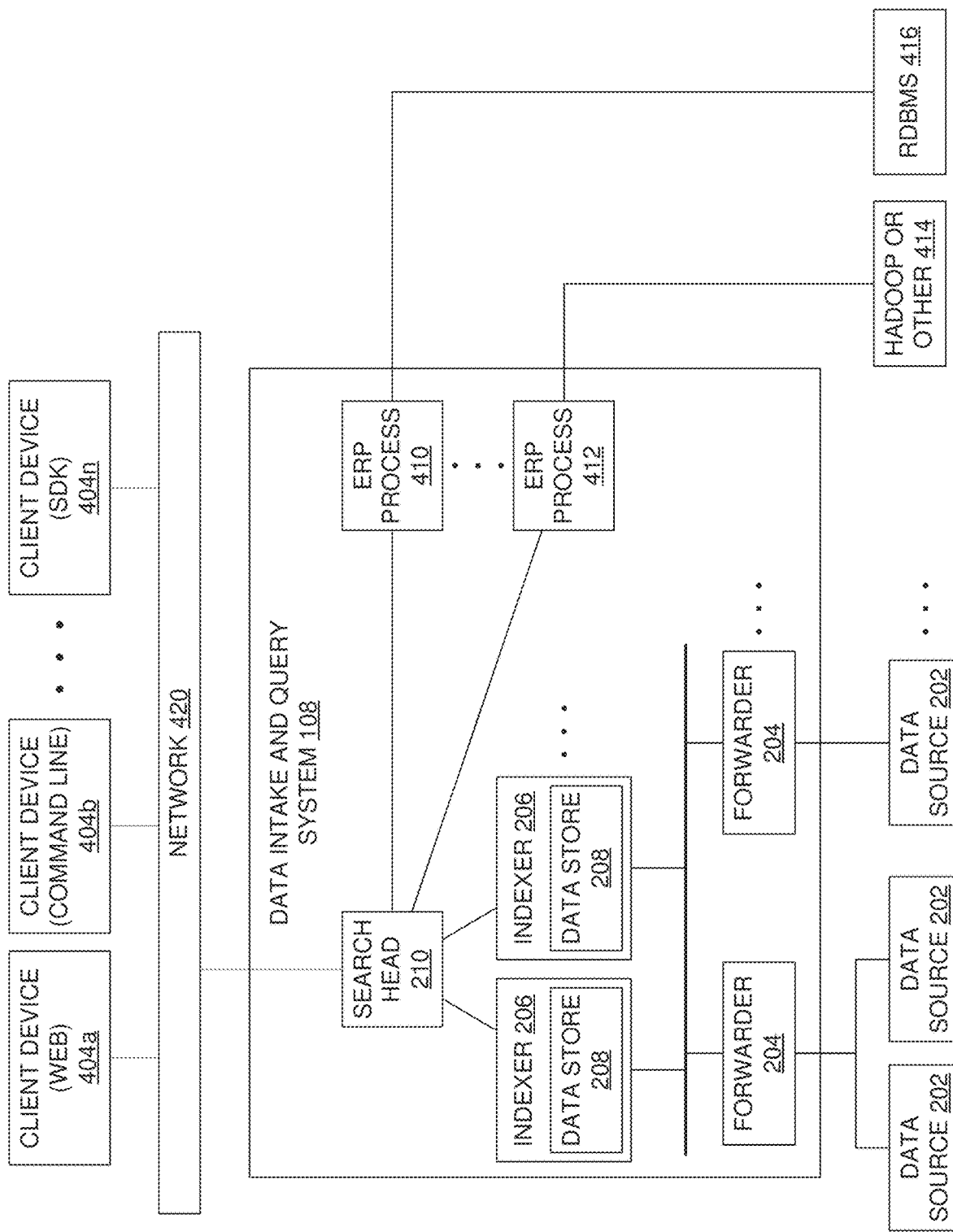

| Time 535 | Host 536 | Source 537 | Source Type 538 | Event 539 |
|---|---|---|---|---|
| 531 — 10/10/2000 1:55 p.m. | www1 | access.log | access_combined | 127.0.0.1 – frank [10/Oct/2000:13:55:36-0700] "GET/apache.gif HTTP/1.0" 200 2326 [0.0947]<br>540  541  542  545<br>543 |
| 532 — 10/10/2000 1:56 p.m. | www2 | access.log | access_combined | 127.0.0.1 – bob [10/Oct/2000:13:56:36-0700] "GET/mickey_mouse.gif HTTP/1.0" 200 2980 [0.0899]<br>546 |
| 533 — 10/10/2000 1:57 p.m. | www2 | access.log | access_combined | 127.0.0.1 – carlos [10/Oct/2000:13:57:36-0700] "GET/donald_duck.gif HTTP/1.0" 200 2900 0.0857 |
| 534 — 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

FIG. 5C

| Row | Time | | Host | Source | Source Type | Event |
|---|---|---|---|---|---|---|
| 55000 | 10/10/2016 | 1:55 p.m. | www1 | access.log | access_combined | 127.0.0.1 - frank [10/Oct/2016:13:55:36 -0700] "GET /apache.gif HTTP/1.0" 200 2326 0.0947  <u>731</u> |
| 55001 | 10/10/2016 | 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 | 1:57 p.m. | www2 | access.log | access_combined | 127.0.0.1 - carlos [10/Oct/2016:13:57:36 -0700] "GET /donald_duck.gif HTTP/1.0" 200 2900 0.0857  <u>732</u> |
| 55003 | 10/10/2016 | 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 | 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 | 2:00 p.m. | www1 | access.log | access_combined | 127.0.0.1 - matt [10/Oct/2016:14:00:36 -0700] "GET /goofy.gif HTTP/1.0" 200 2920 0.0987  <u>733</u> |
| 55006 | 10/10/2016 | 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 | 2:02 p.m. | www1 | access.log | access_combined | 127.0.0.1 - jack [10/Oct/2016:14:02:36 -0700] "GET /muppets.gif HTTP/1.0" 200 5000 0.0667  <u>734</u> |

723

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

722

| Event Reference Value | Field Name | Field Value | User ID |
|---|---|---|---|
| 55000 | clientip | 127.0.0.1 | frank |
| 55005 | clientip | 127.0.0.1 | matt |

Data Summary

| Hosts (5) | Sources (8) | Sourcetypes (3) | | ✕ | filter

| Host ≎ | | Count ≎ | Last Update ≎ |
|---|---|---|---|
| mailsv | ⋮ ⌄ | 9,829 | 4/29/14 1:32:47.000 PM |
| vendor_sales | ⋮ ⌄ | 30,244 | 4/29/14 1:32:46.000 PM |
| www1 | ⋮ ⌄ | 24,221 | 4/29/14 1:32:44.000 PM |
| www2 | ⋮ ⌄ | 22,595 | 4/29/14 1:32:47.000 PM |
| www3 | ⋮ ⌄ | 22,975 | 4/29/14 1:32:45.000 PM |

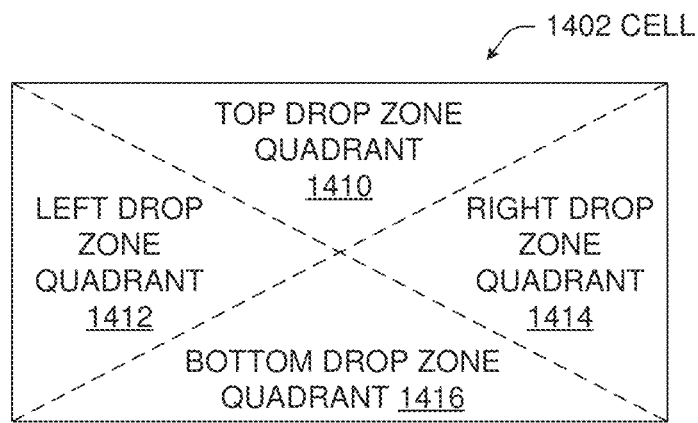
FIG. 14B
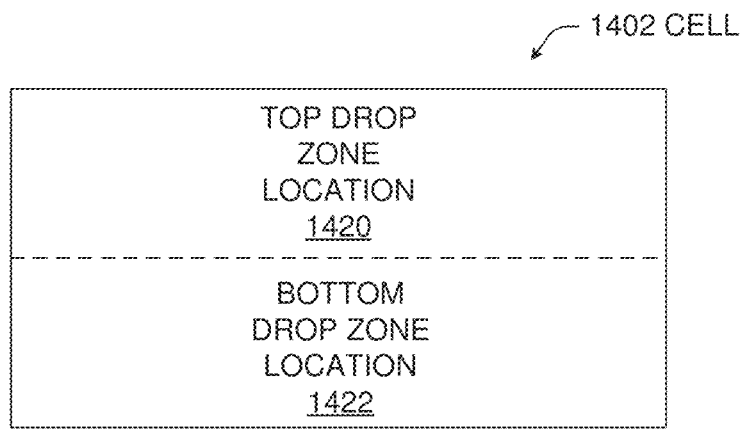
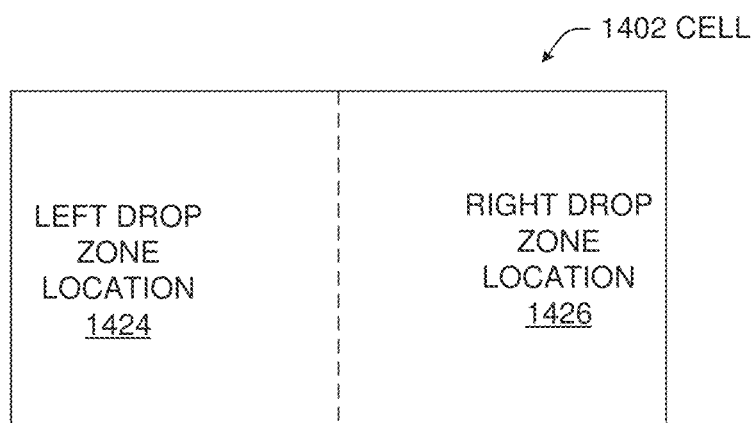
FIG. 14C

INTERFACE FOR CUSTOMIZING DASHBOARDS BASED ON PARALLEL EDGES

CROSS REFERENCE TO RELATED APPLICATIONS

The present application is a continuation of, and therefore claims benefit to, U.S. patent application Ser. No. 17/086,093, filed on Oct. 30, 2020, entitled "Customization Tools for Dashboards." U.S. patent application Ser. No. 17/086,093 is a non-provisional application of, and therefore, claims benefit under 35 U.S.C. § 119(e) to U.S. Patent Application Ser. No. 63/093,056, filed on Oct. 16, 2020, entitled, "Customization Tool for Dashboards." U.S. patent application Ser. No. 17/086,093 and U.S. Patent Application Ser. No. 63/093,056 are incorporated herein by reference in their entirety.

BACKGROUND

Computer systems pervade almost every aspect of business and technology. One of the abilities of computer systems is to quickly analyze large volumes of data and present, in a user interface, the data. A goal of the user interface is to accurately present important data in a manner that a user viewing the interface can easily understand the information presented. One method of presenting information is in the form of a dashboard. A dashboard is a collection of visualizations and menu options that allows end users to understand a set of performance metrics. Dashboards may present data that is regularly updated. Thus, with a useful dashboard, users can identify trends and gain insights into systems being monitored.

BRIEF DESCRIPTION OF DRAWINGS

The present disclosure is illustrated by way of example, and not limitation, in the figures of the accompanying drawings, in which like reference numerals indicate similar elements and in which:

FIG. 4 is a block diagram of an example data intake and query system that performs searches across external data systems, in accordance with example embodiments;

FIG. 5C provides a visual representation of the manner in which a pipelined search language or query operates, in accordance with example embodiments;

FIG. 7C illustrates an example of creating and using an inverted index, in accordance with example embodiments;

FIG. 8B is an interface diagram of an example user interface for a data summary dialog that enables a user to select various data sources, in accordance with example embodiments;

FIG. 12B is an interface diagram of an example user interface of an incident review dashboard, in accordance with example embodiments;

FIG. 14B depicts an example schematic diagram of a cell partitioned into quadrants, in accordance with example embodiments;

FIG. 14C depicts an example schematic diagram of a cell with drop locations, in accordance with example embodiments;

DETAILED DESCRIPTION

Figure 1:
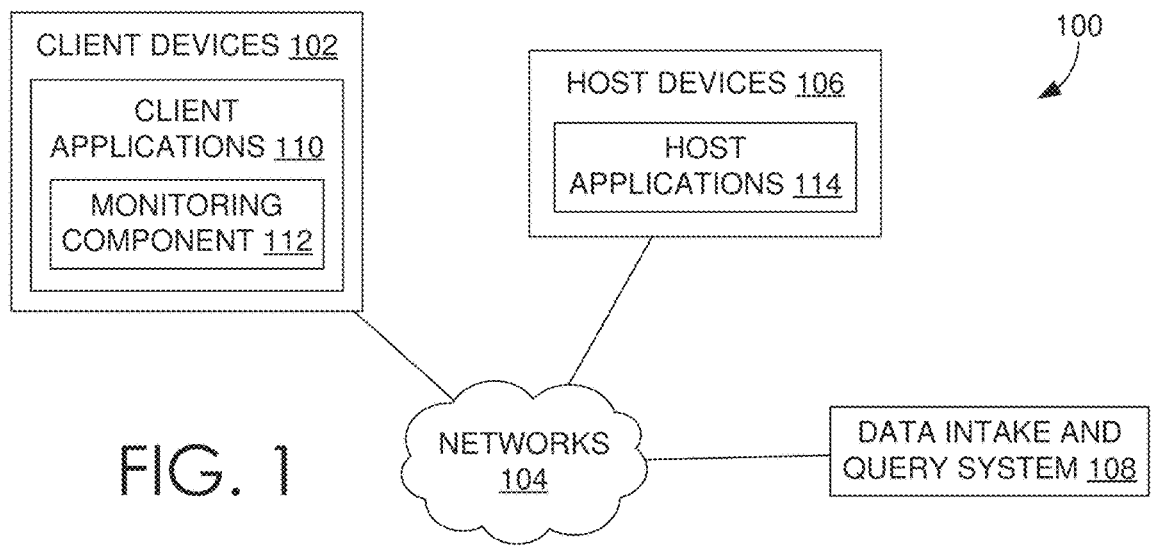
FIG. 1 is a block diagram of an example networked computer environment, in accordance with example embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

One or more embodiments are directed to an editor interface for editing a dashboard. The editor interface is configured to automatically change sizing and location of visualizations within a dashboard based on user input. In one or more embodiments, the user input is performed via dragging and dropping events within the editor interface. In response to a user selecting a drop zone location, the editor interface automatically resizes at least one neighboring visualization to make room for the selected visualization. One or more embodiments may further include interfaces for modifying individual visualizations.

Embodiments are described herein according to the following outline:
1.0. General Overview
2.0. Operating Environment
  2.1. Host Devices
  2.2. Client Devices
  2.3. Client Device Applications
  2.4. Data Server System
  2.5. Cloud-Based System Overview
    2.5.1 Containerized, Stateless Cloud-Based System Overview
  2.6. Searching Externally-Archived Data
    2.6.1. ERP Process Features
  2.7. Data Ingestion
    2.7.1. Input
    2.7.2. Components And Protocols For Receiving Data
    2.7.3. Parsing
    2.7.4. Indexing
  2.8. Query Processing
  2.9. Pipelined Search Language
  2.10. Field Extraction
  2.11. Example Search Screen
  2.12. Data Models
  2.13. Acceleration Technique
    2.13.1. Aggregation Technique
    2.13.2. Keyword Index
    2.13.3. High Performance Analytics Store
      2.13.3.1. Extracting Event Data Using Posting
    2.13.4. Accelerating Report Generation
  2.14. Security Features
  2.15. Data Center Monitoring
  2.16. IT Service Monitoring
3.0. Customization Tool for Dashboards
4.0. Terminology 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data is collected and stored as "events". An event comprises a portion of machine data and is associated with a specific point in time. The portion of machine data may reflect activity in an information technology (IT) environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, IoT devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the flexible schema is not applied to events until search time, the flexible schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The data intake and query system parses the machine data to produce events each having a portion of machine data associated with a timestamp. The data intake and query system stores the events in a data store. The data intake and query system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the data intake and query system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the data intake and query system to field-search the machine data of events to identify events that have the field name "UserID." In another example, a search having criteria that specifies a field name "UserID" with a corresponding field value "12345" may cause the data intake and query system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, a source, or a source type. When events are to be searched based on a particular field name specified in a search, the data intake and query system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters forms a search pattern. An extraction rule comprising a regular expression is referred to herein as a regex rule. The data intake and query system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself or may be located during execution of the query. Hence, as a user learns more about the data in the events, the user can continue to refine the late-binding schema by adding new fields, deleting fields, or modifying the field extraction rules for use the next time the late-binding schema is used by the data intake and query system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the data intake and query system facilitates use of a "common information model" (CIM) across the disparate data sources (further discussed with respect to FIG. 7A).

2.0. Operating Environment

FIG. 1 is a block diagram of an example networked computer environment (100), in accordance with example embodiments. Those skilled in the art would understand that FIG. 1 represents one example of a networked computer system and other embodiments may use different arrangements.

The example networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more Local Area Networks (LANs), Wide Area Networks (WANs), cellular networks (e.g., Long-Term Evolution (LTE), High Speed Packet Access (HSPA), 3G, and other cellular technologies), and/or networks using any of wired, wireless, terrestrial microwave, or satellite links, and may include the public Internet.

2.1. Host Devices

In the illustrated embodiment, a networked computer system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, Hyper Text Markup Language (HTML) documents, media content, etc. The communication between a client device 102 and a host application 114 may include sending various requests and receiving data packets. For example, in general, a client device 102 or an application running on a client device may initiate communication with a host application 114 by making a request for a specific resource (e.g., based on an HTTP request), and the application server may respond with the requested content stored in one or more response packets.

In the illustrated embodiment, one or more instances of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or an "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device 102 and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a data intake and query system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that calls or otherwise invokes the monitoring component 112. As such, a developer of a client application 110 can add one or more lines of code into the client application 110 to trigger the monitoring component 112 at desired points during execution of the application. Code that triggers the monitoring component 112 may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application 110, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network 104 and/or network performance. Network performance data may include, for instance, a uniform resource locator (URL) requested, a connection type (e.g., HTTP, Hypertext Transfer Protocol Secure (HTTPS), etc.), a connection start time, a connection end time, an HTTP status code, a request length, a response length, request headers, response headers, a connection status (e.g., completion, response time(s), failure, etc.), and the like. Upon obtaining network performance data indicating performance of the network 104, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device 102 based on a request from the client device 102 to download the application.

Examples of functionality that enables monitoring performance of a client device 102 are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and a network carrier, current memory performance information, a geographic location of the device, a device orientation, and any other information related to the operational state of the client device 102.

In some embodiments, the monitoring component 112 may also monitor and collect other device profile information including, for example, a type of client device 102, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
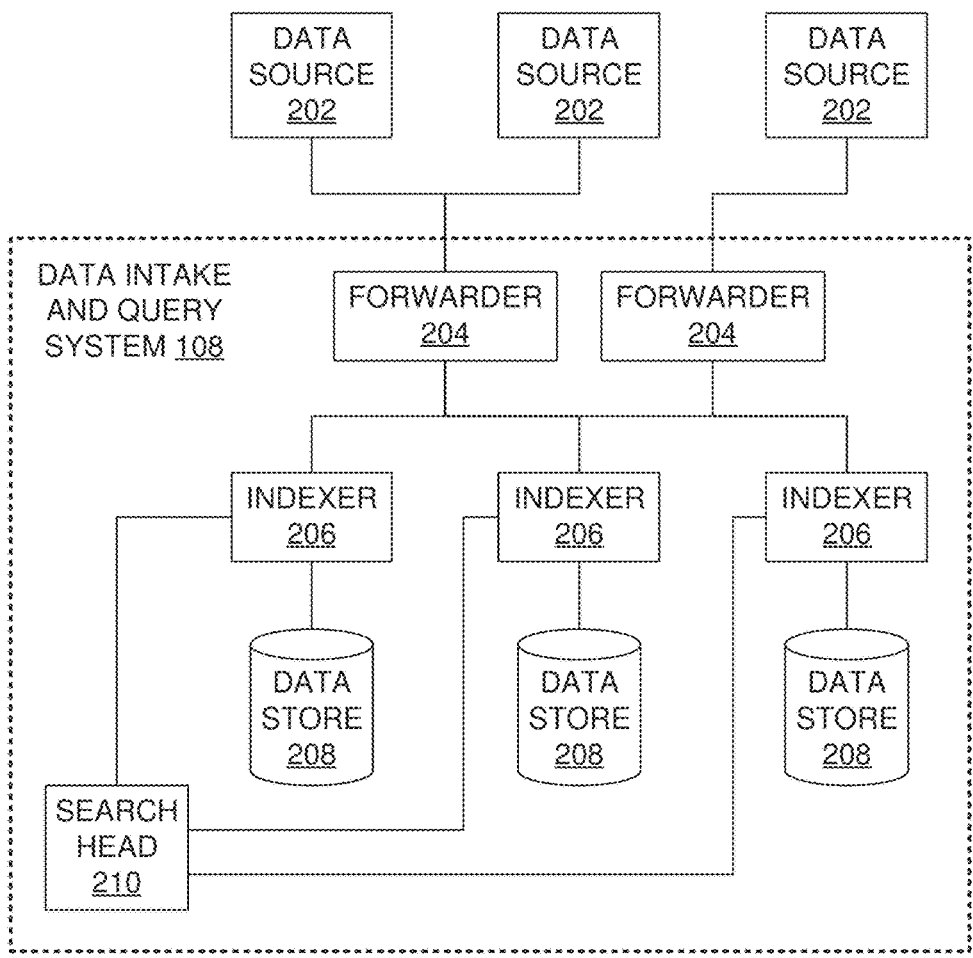
FIG. 2 is a block diagram of an example data intake and query system, in accordance with example embodiments.

FIG. 2 is a block diagram of an example data intake and query system 108, in accordance with example embodiments. Data intake and query system 108 includes one or more forwarders 204 that receive data from a variety of data sources 202, and one or more indexers 206 that process and store the data in one or more data stores 208. These forwarders 204 and indexers 206 can comprise separate computer systems or may alternatively comprise separate processes executing on one or more computer systems.

Each data source 202 broadly represents a distinct source of data that can be consumed by data intake and query system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers 206. Forwarders 204 can also perform operations on the data before forwarding, including removing extraneous data, detecting timestamps in the data, the parsing data, the indexing data, the routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer 206. For example, a forwarder 204 may perform keyword extractions on raw data or parse raw data to create events. A forwarder 204 may generate timestamps for events. Additionally, or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders 204, indexers 206, and search heads 210. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder 204, an indexer 206, a search head 210, etc. This arrangement generally may be referred to as an "on-premises" solution. That is, the data intake and query system 108 is installed and operates on computing devices directly controlled by the user of the data intake and query system 108. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of data intake and query system 108 operate.

In one embodiment, to provide an alternative to an entirely on-premises environment for the data intake and query system 108, one or more of the components of a data intake and query system 108 instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the data intake and query system 108 (e.g., forwarders 204, indexers 206, search heads 210, etc.) and by providing access to the data intake and query system 108 to end users via a network. Typically, a user may pay a subscription or other fee to use such a service. Each subscribing user of the cloud-based service may be provided with an account that enables the user to configure a customized cloud-based system based on the user's preferences.

Figure 3:
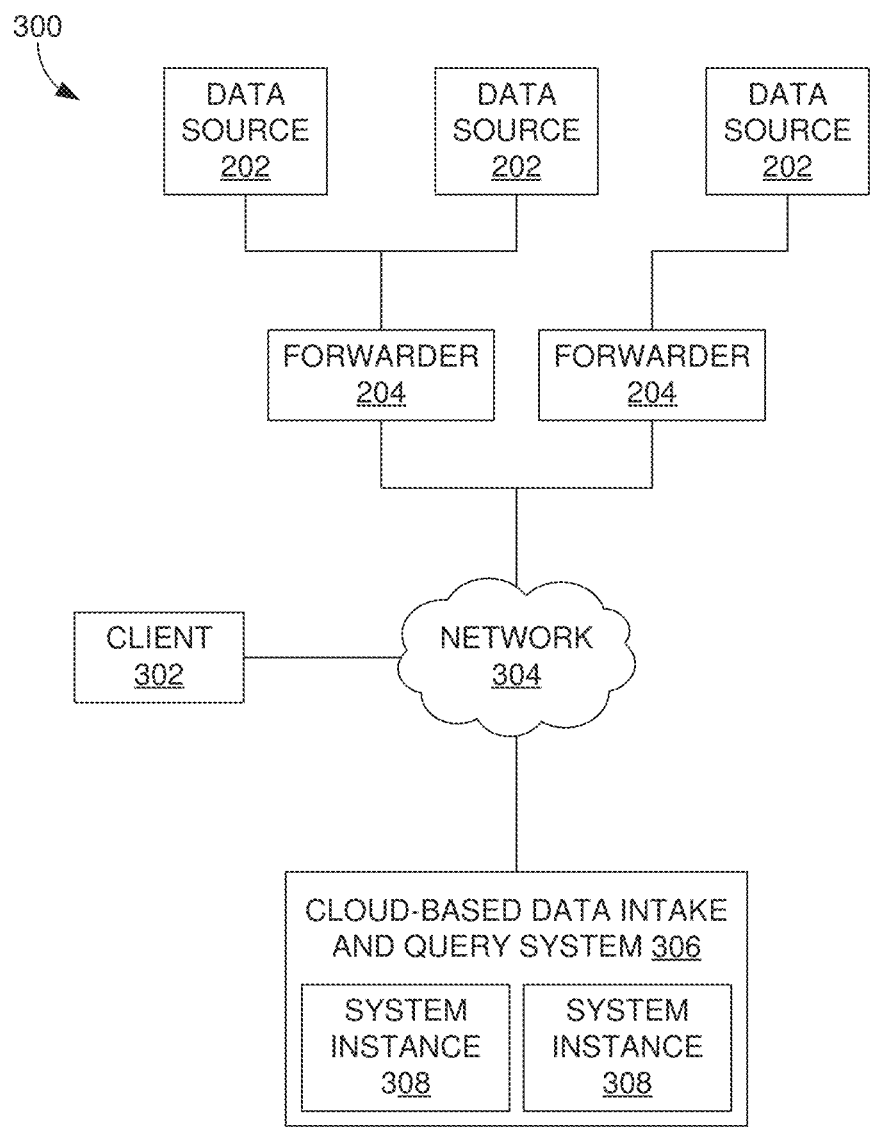
FIG. 3 is a block diagram of an example cloud-based data intake and query system, in accordance with example embodiments.

FIG. 3 illustrates a block diagram of an example cloud-based data intake and query system 306. Similar to the system of FIG. 2, the networked computer system 300 includes data sources 202 and forwarders 204. These data sources 202 and forwarders 204 may be in a subscriber's private computing environment. Alternatively, they might be directly managed by the service provider as part of the cloud service. In the example networked computer system 300, one or more forwarders 204 and clients 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the cloud-based data intake and query system 306. Similar to the system of FIG. 2, each of the forwarders 204 may be configured to receive data from an input source and to forward the data to other components of the cloud-based data intake and query system 306 for further processing.

In some embodiments, a cloud-based data intake and query system 306 may comprise a plurality of system instances 308. In general, each system instance 308 may include one or more computing resources managed by a provider of the cloud-based data intake and query system 306 made available to a particular subscriber. The computing resources comprising a system instance 308 may, for example, include one or more servers or other devices configured to implement one or more forwarders 204, indexers, search heads, and other components of a data intake and query system, similar to data intake and query system 108. As indicated above, a subscriber may use a web browser or other application of a client device 302 to access a web portal or other interface that enables the subscriber to configure a system instance 308.

Providing a data intake and query system as described in reference to data intake and query system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK® CLOUD, are centrally visible).

2.5.1 Containerized, Stateless Cloud-Based System Overview

As shown in the previous figures, various embodiments may refer to a data intake and query system 108 that includes one or more of a search head 210, an indexer 206, and a forwarder 204. In other implementations, data intake and query system 108 may be implemented in a cloud-based system, such as cloud-based data intake and query system 306, as shown in FIG. 3. In some implementations, the cloud-based data intake and query system 306 have a different architecture but may carry out indexing and searching in a way that is similar to and in some ways functionally equivalent from the perspective of the end user. For example, cloud-based data intake and query system 306 may be re-architected to run in a stateless, containerized environment. In some of these embodiments, cloud-based data intake and query system 306 may be run in a computing cloud provided by a third party or provided by the operator of the cloud-based data intake and query system 306. This type of cloud-based data intake and query system 306 may have several benefits, including, but not limited to, lossless data ingestion, more robust disaster recovery, and faster or more efficient processing, searching, and indexing. A cloud-based data intake and query system 306 as described in this section may provide separately scalable storage resources and compute resources, or separately scalable search and index resources. Additionally, the cloud-based data intake and query system 306 may allow for applications to be developed on top of the data intake and query system 108, to extend or enhance functionality, through a gateway layer or one or more Application Programming Interfaces (APIs), which may provide customizable access control or targeted exposure to the workings of the cloud-based data intake and query system 306.

In some embodiments, a cloud-based data intake and query system 306 may include an intake system. Such an intake system can include, but is not limited to, an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, indexed data may be stored in buckets, which may be stored in a persistent storage once certain bucket requirements have been met and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system 306 may implement tenant-based and user-based access control. In some embodiments, the cloud-based data intake and query system 306 may implement an abstraction layer, through a gateway portal, an API, or some combination thereof, to control or limit access to the functionality of the cloud-based data intake and query system 306. In some embodiments, the cloud-based data intake and query system 306 may be multi-tenant, so that containerized search and indexing may be done across multiple tenants.

2.6. Searching Externally-Archived Data

FIG. 4 shows a block diagram of an example of a data intake and query system 108 that provides transparent search facilities for data systems that are external to the data intake and query system 108. Such facilities are available in the Splunk® Analytics for Hadoop® system provided by Splunk Inc. of San Francisco, Calif. Splunk® Analytics for Hadoop® represents an analytics platform that enables businesses and IT teams to rapidly explore, analyze, and visualize data in Hadoop® and NoSQL data stores.

The search head 210 of the data intake and query system 108 receives search requests from one or more client devices 404 over network connections 420. As discussed above, the data intake and query system 108 may reside in an enterprise location, in the cloud, etc. FIG. 4 illustrates that multiple client devices 404a, 404b . . . 404n may communicate with the data intake and query system 108. The client devices 404 may communicate with the data intake and query system 108 using a variety of connections. For example, one client device 404a in FIG. 4 is illustrated as communicating over an Internet (Web) protocol, another client device 404b is illustrated as communicating via a command line interface, and another client device 404n is illustrated as communicating via a software developer kit (SDK).

The search head 210 analyzes the received search request to identify request parameters. If a search request received from one of the client devices 404 references an index maintained by the data intake and query system 108, then the search head 210 connects to one or more indexers 206 of the data intake and query system 108 for the index referenced in the request parameters. That is, if the request parameters of the search request reference an index, then the search head 210 accesses the data in the index via the indexer 206. The data intake and query system 108 may include one or more indexers 206, depending on system access resources and requirements. As described further below, the indexers 206 retrieve data from their respective local data stores 208 as specified in the search request. The indexers 206 and their respective data stores 208 can comprise one or more storage devices and typically reside on the same system, though they may be connected via a local network 420.

If the request parameters of the received search request reference an external data collection, which is not accessible to the indexers 206 or under the management of the data intake and query system 108, then the search head 210 can access the external data collection through an External Result Provider (ERP) process 410, 412. An external data collection may be referred to as a "virtual index" (plural, "virtual indices"). An ERP process 410, 412 provides an interface through which the search head 210 may access virtual indices.

Thus, a search reference to an index of the data intake and query system 108 relates to a locally stored and managed data collection. In contrast, a search reference to a virtual index relates to an externally stored and managed data collection, which the search head 210 may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head 210 may spawn different ERP processes 410, 412 for different virtual indices. Generally, virtual indices that share common data configurations or protocols may share ERP processes 410, 412. For example, all search query references to a Hadoop file system may be processed by the same ERP process, if the ERP process is suitably configured. Likewise, all search query references to a SQL database may be processed by the same ERP process. In addition, the search head 210 may provide a common ERP process for common external data source types (e.g., a common vendor may utilize a common ERP process, even if the vendor includes different data storage system types, such as Hadoop and SQL). Common indexing schemes also may be handled by common ERP processes 410, 412, such as flat text files or Weblog files.

The search head 210 determines the number of ERP processes 410, 412 to be initiated via the use of configuration parameters that are included in a search request message. Generally, there is a one-to-many relationship between an external results provider "family" and ERP processes 410, 412. There is also a one-to-many relationship between an ERP process and corresponding virtual indices that are referred to in a search request. For example, using RDBMS 416, assume two independent instances of such a system by one vendor, such as one RDBMS 416 for production and another RDBMS 416 used for development. In such a situation, it is likely preferable (but optional) to use two ERP processes 410, 412 to maintain the independent operation as between production and development data. Both of the ERP processes 410, 412, however, will belong to the same family, because the two RDBMS system types are from the same vendor.

The ERP processes 410, 412 receive a search request from the search head 210. The search head 210 may optimize the received search request for execution at the respective external virtual index. Alternatively, the ERP process may receive a search request as a result of analysis performed by the search head 210 or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system 108. Each ERP process 410, 412 may be provided by the data intake and query system 108 or may be provided by process or application providers who are independent of the data intake and query system 108. Each respective ERP process 410, 412 may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results, or a processed set of results based on the returned results to the respective client device.

Client devices 404 may communicate with the data intake and query system 108 through a network 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes 410, 412 described above may include two operation modes: a streaming mode and a reporting mode. The ERP processes 410, 412 can operate in streaming mode only, in reporting mode only, or in both modes simultaneously. Operating in both modes simultaneously is referred to as mixed mode operation. In a mixed mode operation, the ERP at some point can stop providing the search head 210 with streaming results and only provide reporting results thereafter, or the search head 210 at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head 210, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head 210, which can then process the results data (e.g., break the machine data into events, timestamp it, filter it, etc.) and integrate the results data with the results data from other external data sources, and/or from data stores 208 of the search head 210. The search head 210 performs such processing and can immediately start returning interim (streaming mode) results to the user at the requesting client device; simultaneously, the search head 210 is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head 210, enabling the search head 210 to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head 210 and switching to reporting mode only. The ERP at this point starts sending interim results in reporting mode to the search head 210, which in turn may then present this processed data responsive to the search request to the client or search requester. Typically, the search head 210 switches from using results from the ERP's streaming mode of operation to results from the ERP's reporting mode of operation when the higher bandwidth results from the reporting mode outstrip the amount of data processed by the search head 210 in the streaming mode of ERP operation.

A reporting mode may have a higher bandwidth because the ERP does not have to spend time transferring data to the search head 210 for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, timestamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head 210 typically understands how to use that language to obtain data from the indexers, which store data in a format used by the SPLUNK® Enterprise system.

The ERP processes 410, 412 support the search head 210, as the search head 210 is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head 210) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head 210 to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head 210. As noted, the ERP process could be configured to operate in streaming mode alone and return just the machine data for the search head 210 to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head 210 when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head 210 for each chunk.

For example, an ERP process can be configured to merely return the contents of a search result file verbatim, with little or no processing of results. That way, the search head 210 performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
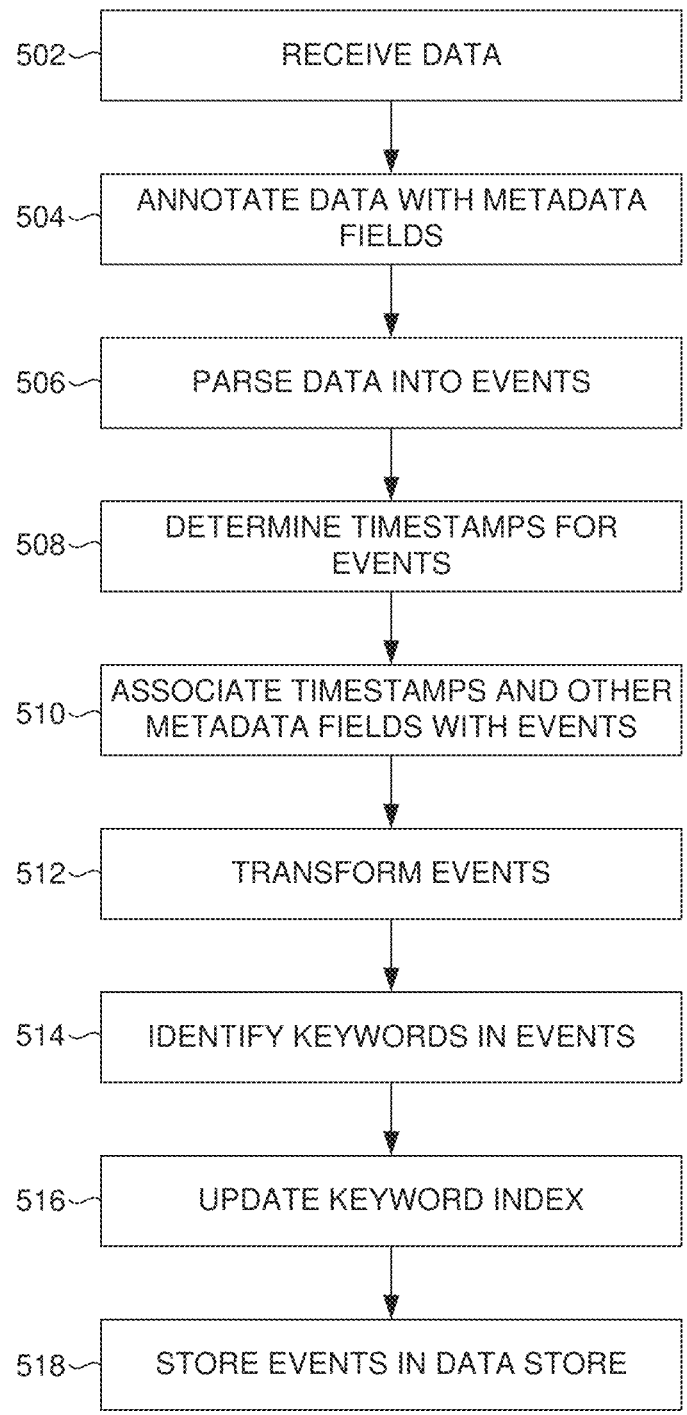
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a timestamp with a portion of data and create an event, etc.) and can route data based on criteria such as source or type of event. The forwarder can also index data locally while forwarding the data to another indexer.

2.7.2. Components and Protocols for Receiving Data

In various embodiments, forwarders 204 may communicate with indexers 206 via one or more data transfer protocols. Although any number of data transfer protocols may be used, in some implementations, forwarders 204 communicate with indexers 206 through use of a binary protocol referred to as "S2S" or "Splunk-to-Splunk" protocol. S2S protocol specifies that, after the forwarder 204 and indexer 206 connect over a network via a port, e.g., a Transmission Control Protocol (TCP) port, the forwarder 204 sends a message to the indexer 206 describing the S2S protocol features it would like to use. In response, the indexer 206 responds with a message that describes the S2S protocol features that have been accepted for network communication with the forwarder 204, based on the feature request description from forwarder 204. These requests may include, for example, per-event ACK (acknowledgement) payloads, or various compression algorithms used to reduce the size of events to be transferred. After the forwarder 204 receives notification of the features that will be used in communicating with indexer 206, the forwarder 204 begins sending serialized objects in binary format. The objects may include one or more events and/or various metadata associated with the events. The objects may be compressed using various compression algorithms, or otherwise packaged, reduced, or encrypted. In some embodiments, each event may be compressed separately, and in other embodiments, packages of events may be compressed together. In other embodiments, the S2S protocol may be used by forwarders 204 to send information to any receiving component of the data intake and query system 108, including, e.g., components of the cloud-based data intake and query system 306.

In various embodiments, other data transfer protocols may be used to transmit data from the one or more data sources 102 into the data intake and query system. Specifically, in various embodiments, it may be advantageous to set up protocols for transmitting data into the data intake and query system without requiring the use of forwarders 204. Thus, there are embodiments in which the Hyper Text Transfer Protocol (HTTP) can be used to transmit data from data sources 102 to the data intake and query system. In order to facilitate use of HTTP to transmit this data, various embodiments of data intake and query system 108 may include an HTTP Event Collector, or "HEC." The HEC is an agent that is part of the data intake and query system 108, and which can receive information sent from data sources 102. Use of the HEC has the advantage of generally not requiring any additional components, either hardware or software, to be added to or installed on the data sources 102, beyond what is required to send messages using HTTP "POST" commands.

In various embodiments, the HEC operates at the data intake and query system 108 to receive HTTP POST requests from various sources, e.g., data sources 102. The HEC begins the process through generation of tokens, which can be distributed to the data sources 102 through a variety of known methods, both manual and automated. A data source 102 can access the HEC by sending an HEC token to the HEC, e.g., through the authentication header of an HTTP POST request. Once this token is recognized by the HEC, the data source 102 can send data in any format to the HEC, using the HTTP POST command. Although any type of data can be sent to the HEC through an HTTP POST command, in various implementations, event data may be submitted, either in raw text format, or in JavaScript Object Notation (JSON) format. In various implementations, events sent in the JSON format may include metadata, such as one or more of a timestamp of the event, a host name of the event, a source of the event, and a sourcetype of the event. Upon receipt of the data from the HTTP POST command, the HEC may send the data to an indexer 206, or, for example, in a cloud-based data intake and query system 306, place the data in an ingestion buffer, such as a message-oriented pub/sub or a stream processor.

2.7.3. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events and may also include one or more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the timestamp metadata field 535 can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 537.

In the example shown in FIG. 5C, each of the events 531-533 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds. As seen in FIG. 5C, all the raw machine data retrieved from the server access log is retained and stored as part of the corresponding events, 531-533 in the data store.

Event 534 is associated with an entry in a server error log, as indicated by "error.log" in the source column 537 that records errors that the server encountered when processing a client request. Similar to the events 531-533 related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules or modifying or deleting existing extraction rules used by the system.

2.7.4. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers 206 and data stores 208, the indexers 206 can analyze events for a query in parallel. For example, using map-reduce techniques, each indexer 206 returns partial responses for a subset of events to a search head 210 that combines the results to produce an answer for the query. By storing events in buckets for specific time ranges, an indexer 206 may further optimize the data retrieval process by searching buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, an indexer 206 may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers 206 and data stores 208 to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
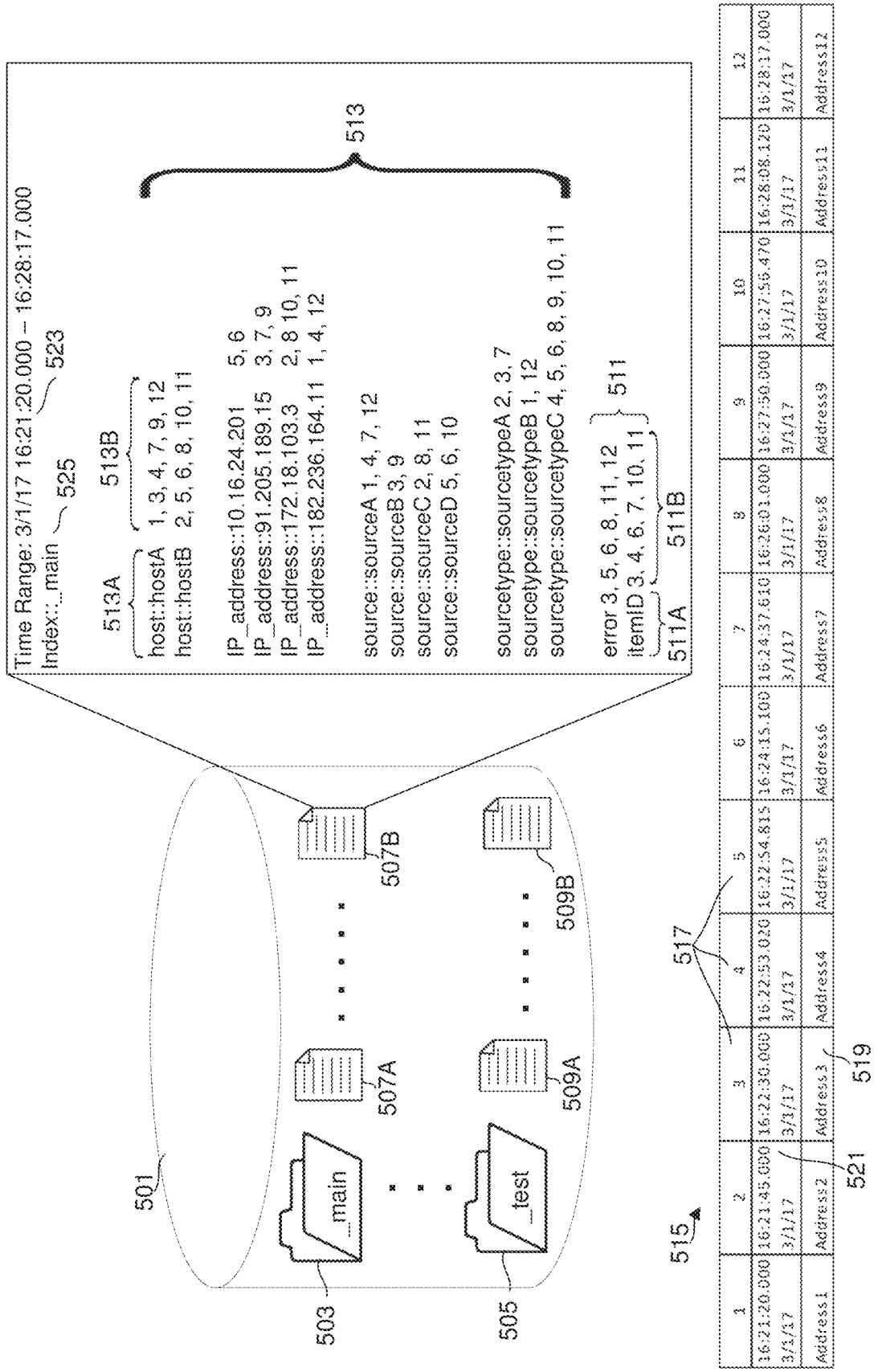
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer 206. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory, or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index 507A . . . 507B, and 509A . . . 509B can correspond to a particular range of time for an index. Additional files, such as high-performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index 507A . . . 507B, and 509A . . . 509B or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token 511A. For example, for the token "error," 511A the corresponding token entry 511 includes the token "error" 511A and an event reference, or unique identifier, for each event stored in the corresponding time-series bucket that includes the token "error." 511A. In the illustrated embodiment of FIG. 5B, the error token entry 511 includes the identifiers 3, 5, 6, 8, 11, and 12 corresponding to events managed by the indexer 206 and associated with the index_main 503 that is located in the time-series bucket associated with the inverted index 507B.

In some cases, some token entries 511 can be default entries, automatically determined entries, or user specified entries. In some embodiments, the indexer 206 can identify each word or string in an event as a distinct token and generate a token entry 511 for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries 511 can be included as a default, automatically determined, and/or included based on user-specified criteria.

Similarly, field-value pair entries, such as field-value pair entries 513 shown in inverted index 507B, can include a field-value pair 513A and event references 513B indicative of events that include a field value that corresponds to the field-value pair 513A. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries 513 for the fields host, source, sourcetype can be included in the inverted indexes 507A . . . 507B, and 509A . . . 509B as a default. As such, all of the inverted indexes 507A . . . 507B, and 509A . . . 509B can include field-value pair entries 513 for the fields host, source, sourcetype. As yet another non-limiting example, the field-value pair entries 513 for the IP_address field can be user specified and may only appear in the inverted index 507B based on user-specified criteria. As another non-limiting example, as the indexer 206 indexes the events, it can automatically identify field-value pairs and create field-value pair entries 513. For example, based on the indexers 206 review of events, it can identify IP_address as a field in each event and add the IP_address field-value pair entries 513 to the inverted index 507B. It will be understood that any combination of field-value pair entries 513 can be included as a default, automatically determined, or included based on user-specified criteria.

Each unique identifier 517, or event reference, can correspond to a unique event located in the time series bucket. However, the same event reference can be located in multiple entries. For example, if an event has a sourcetype splunkd, host www1 and token "warning," then the unique identifier for the event will appear in the field-value pair entries 513 sourcetype::splunkd and host::www1, as well as the token entry "warning." 511. With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index 507B may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries 513. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index 507B can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index 507B, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers 206 can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer 206 identifies relevant inverted indexes to be searched. For example, if the filter criteria include a set of partitions, the indexer 206 can identify the inverted indexes 507A . . . 507B, and 509A . . . 509B stored in the directory corresponding to the particular partition as relevant inverted indexes. Other means can be used to identify inverted indexes associated with a partition of interest. For example, in some embodiments, the indexer 206 can review an entry in the inverted indexes 507A . . . 507B, and 509A . . . 509B, such as a field-value pair entry 513 to determine if a particular inverted index is relevant. If the filter criteria do not identify any partition, then the indexer 206 can identify all inverted indexes managed by the indexer 206 as relevant inverted indexes.

Similarly, if the filter criteria include a time range, the indexer 206 can identify inverted indexes corresponding to buckets that satisfy at least a portion of the time range as relevant inverted indexes. For example, if the time range is last hour then the indexer 206 can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer 206 can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria include a partition main, then the indexer can determine that any events identified using inverted indexes within the partition main directory (or otherwise associated with the partition main) satisfy the index filter criterion.

Furthermore, based on the time range associated with each inverted index, the indexer 206 can determine that that any events identified using a particular inverted index satisfies a time range filter criterion. For example, if a time range filter criterion is for the last hour and a particular inverted index corresponds to events within a time range of 50 minutes ago to 35 minutes ago, the indexer 206 can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes 507A . . . 507B, and 509A . . . 509B, the indexer 206 can identify event references (and therefore events) that satisfy the filter criteria. For example, if the token "error" 511A is a filter criterion, the indexer 206 can track all event references within the token entry "error." 511A. Similarly, the indexer 206 can identify other event references located in other token entries or field-value pair entries 513 that match the filter criteria. The system can identify event references located in all of the entries identified by the filter criteria. For example, if the filter criteria include the token "error" 511A and field-value pair sourcetype::web_ui, the indexer 206 can track the event references found in both the token entry "error" 511A and the field-value pair entry 513 sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer 206 can determine that the events associated with the identified event references satisfy the filter criteria.

In some cases, the indexer 206 can further consult a timestamp associated with the event reference to determine whether an event satisfies the filter criteria. For example, if an inverted index corresponds to a time range that is partially outside of a time range filter criterion, then the indexer 206 can consult a timestamp associated with the event reference to determine whether the corresponding event satisfies the time range criterion. In some embodiments, to identify events that satisfy a time range, the indexer 206 can review an array, such as the event reference array 515 that identifies the time associated with the events. Furthermore, as mentioned above using the known location of the directory in which the relevant inverted indexes are located (or other index identifier), the indexer 206 can determine that any events identified using the relevant inverted indexes satisfy the index filter criterion.

In some cases, based on the filter criteria, the indexer 206 reviews an extraction rule. In certain embodiments, if the filter criteria includes a field name that does not correspond to a field-value pair entry 513 in an inverted index, the indexer 206 can review an extraction rule, which may be located in a configuration file, to identify a field that corresponds to a field-value pair entry 513 in the inverted index 507B.

For example, the filter criteria includes a field name "sessionID" and the indexer determines that at least one relevant inverted index does not include a field-value pair entry 513 corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry 513 in the inverted index 507B that includes a field value corresponding to the identity of the particular host, source, or sourcetype identified using the extraction rule.

Once the events that satisfy the filter criteria are identified, the data intake and query system, such as the indexer 206 can categorize the results based on the categorization criteria. The categorization criteria can include categories for grouping the results, such as any combination of partition, source, sourcetype, or host, or other categories or fields as desired.

The indexer 206 can use the categorization criteria to identify categorization criteria-value pairs or categorization criteria values by which to categorize or group the results. The categorization criteria-value pairs can correspond to one or more field-value pair entries 513 stored in a relevant inverted index, one or more index-value pairs based on a directory in which the inverted index 507B is located or an entry in the inverted index 507B (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries 513 stored in the relevant inverted indexes. For example, the categorization criteria-value pairs can correspond to field-value pair entries 513 of host, source, and sourcetype (or other field-value pair entry 513 as desired). For instance, if there are ten different hosts, four different sources, and five different sourcetypes for an inverted index, then the inverted index 507B can include ten host field-value pair entries, four source field-value pair entries, and five sourcetype field-value pair entries. The indexer 206 can use the nineteen distinct field-value pair entries as categorization criteria-value pairs to group the results.

Specifically, the indexer 206 can identify the location of the event references associated with the events that satisfy the filter criteria within the field-value pairs and group the event references based on their location. As such, the indexer 206 can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries 513 in the relevant inverted indexes. For example, if partition or index is used as a categorization criterion, the inverted indexes 507A . . . 507B, and 509A . . . 509B may not include partition field-value pair entries. Rather, the indexer 206 can identify the categorization criteria-value pair associated with the partition based on the directory in which an inverted index is located, information in the inverted index 507B, or other information that associates the inverted index 507B with the partition, etc. As such a variety of methods can be used to identify the categorization criteria-value pairs from the categorization criteria.

Accordingly based on the categorization criteria (and categorization criteria-value pairs), the indexer 206 can generate groupings based on the events that satisfy the filter criteria. As a non-limiting example, if the categorization criteria include a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria include partition, sourcetype, and host and there are two different partitions, three sourcetypes, and five hosts associated with the identified events, then the indexer 206 can generate up to thirty groups for the results that satisfy the filter criteria. Each group can be associated with a unique combination of categorization criteria-value pairs (e.g., unique combinations of partition value sourcetype value, and host value).

In addition, the indexer 206 can count the number of events associated with each group based on the number of events that meet the unique combination of categorization criteria for a particular group (or match the categorization criteria-value pairs for the particular group). With continued reference to the example above, the indexer 206 can count the number of events that meet the unique combination of partition, sourcetype, and host for a particular group.

Each indexer communicates the groupings to the search head 210. The search head 210 can aggregate the groupings from the indexers 206 and provide the groupings for display. In some cases, the groups are displayed based on at least one of the host, source, sourcetype, or partition associated with the groupings. In some embodiments, the search head 210 can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer 206 determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer 206 reviews the token entries 511 and the field-value pair entries 513 to identify event references, or events that satisfy all of the filter criteria.

With respect to the token entries 511, the indexer 206 can review the error token entry and identify event references 3, 5, 6, 8, 11, 12, indicating that the term "error" is found in the corresponding events. Similarly, the indexer 206 can identify event references 4, 5, 6, 8, 9, 10, 11 in the field-value pair entry 513 sourcetype::sourcetypeC and event references 2, 5, 6, 8, 10, 11 in the field-value pair entry 513 host::hostB. As the filter criteria did not include a source or an IP_address field-value pair, the indexer 206 can ignore those field-value pair entries.

In addition to identifying event references found in at least one token entry or field-value pair entry (e.g., event references 3, 4, 5, 6, 8, 9, 10, 11, 12), the indexer 206 can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry 513 source::sourceD (or have matching categorization criteria-value pairs) and event reference 8 is located in the field-value pair entry 513 source::sourceC. Accordingly, the indexer 206 can generate a sourceC group having a count of one corresponding to reference 8 and a sourceD group having a count of two corresponding to references 5 and 6.

This information can be communicated to the search head 210. In turn the search head 210 can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer 206 communicates the groups to the search head 210 for aggregation with results received from other indexers. In communicating the groups to the search head 210, the indexer 206 can include the categorization criteria-value pairs for each group and the count. In some embodiments, the indexer 206 can include more or less information. For example, the indexer 206 can include the event references associated with each group and other identifying information, such as the indexer 206 or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer 206 identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer 206 communicates the groups to the search head 210 for aggregation with results received from other indexers. As will be understand there are myriad ways for filtering and categorizing the events and event references. For example, the indexer 206 can review multiple inverted indexes associated with a partition or review the inverted indexes 507A . . . 507B, and 509A . . . 509B of multiple partitions, and categorize the data using any one or any combination of partition, host, source, sourcetype, or other category, as desired.

Further, if a user interacts with a particular group, the indexer 206 can provide additional information regarding the group. For example, the indexer 206 can perform a targeted search or sampling of the events that satisfy the filter criteria and the categorization criteria for the selected group, also referred to as the filter criteria corresponding to the group or filter criteria associated with the group.

In some cases, to provide the additional information, the indexer 206 relies on the inverted index 507B. For example, the indexer 206 can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head 210 communicates with the indexer 206 to provide additional information regarding the group.

In some embodiments, the indexer 206 identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer 206 can determine that it will analyze a sample of the events associated with the event references 4, 5, 6, 8, 10, 11. For example, the sample can include analyzing event data associated with the event references 5, 8, 10. In some embodiments, the indexer 206 can use the event reference array 515 to access the event data associated with the event references 5, 8, 10. Once accessed, the indexer 206 can compile the relevant information and provide it to the search head 210 for aggregation with results from other indexers. By identifying events and sampling event data using the inverted indexes 507A . . . 507B, and 509A . . . 509B, the indexer 206 can reduce the amount of actual data this is analyzed and the number of events that are accessed in order to generate the summary of the group and provide a response in less time.

2.8. Query Processing

Figure 6A:
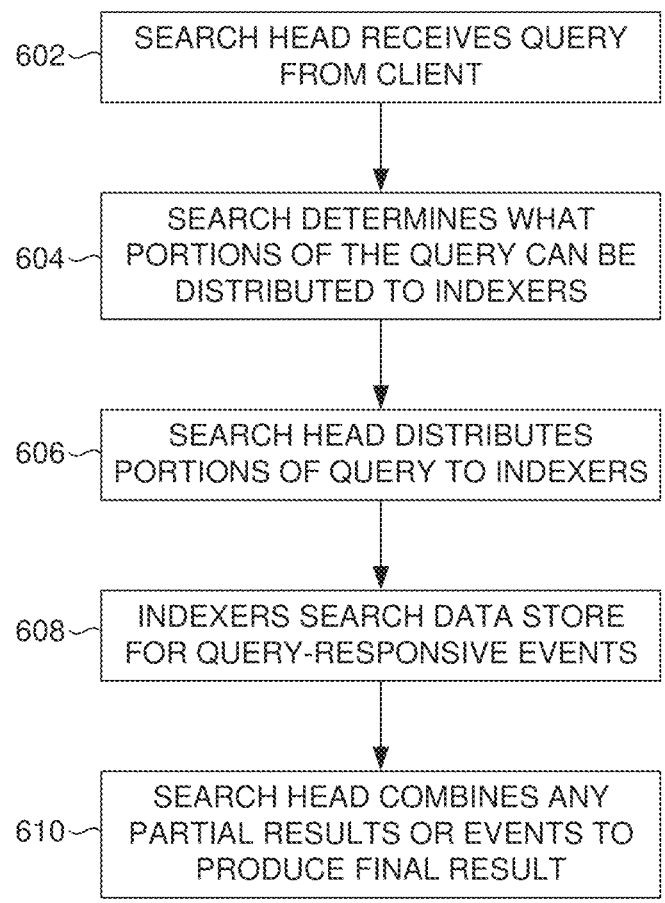
FIG. 6A is a flowchart of an example method that illustrates how a search head and indexers perform a search query, in accordance with example embodiments.

FIG. 6A is a flowchart of an example method that illustrates how a search head 210 and indexers 206 perform a search query, in accordance with example embodiments. At block 602, a search head 210 receives a search query from a client. At block 604, the search head 210 analyzes the search query to determine what portion(s) of the query can be delegated to indexers and what portions of the query can be executed locally by the search head 210. At block 606, the search head 210 distributes the determined portions of the query to the appropriate indexers. In some embodiments, a search head cluster may take the place of an independent search head where each search head in the search head 210 cluster coordinates with peer search heads in the search head cluster to schedule jobs, replicate search results, update configurations, fulfill search requests, etc. In some embodiments, the search head (or each search head) 210 communicates with a master node (also known as a cluster master, not shown in FIG. 2) that provides the search head 210 with a list of indexers to which the search head 210 can distribute the determined portions of the query. The master node maintains a list of active indexers and can also designate which indexers may have responsibility for responding to queries over certain sets of events. A search head 210 may communicate with the master node before the search head 210 distributes queries to indexers to discover the addresses of active indexers.

At block 608, the indexers 206, to which the query was distributed, search the data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers 206 may then either send the relevant events back to the search head 210, or use the events to determine a partial result, and send the partial result back to the search head 210.

At block 610, the search head 210 combines the partial results and/or events received from the indexers 206 to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the data intake and query system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head 210 can also perform various operations to make the search more efficient. For example, before the search head 210 begins execution of a query, the search head 210 can determine a time range for the query and a set of common keywords that all matching events include. The search head 210 may then use these parameters to query the indexers 206 to obtain a superset of the eventual results.

Then, during a filtering stage, the search head 210 can perform field-extraction operations on the superset to produce a reduced set of search results. Performing field-extraction operations on the superset speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "I". In such embodiments, a set of data, such as a set of events, can be operated on by a first SPL command in the sequence, and then a subsequent SPL command following a pipe symbol "I" after the first SPL command operates on the results produced by the first SPL command or other set of data, and so on for any additional SPL commands in the sequence. As such, a query formulated using SPL comprises a series of consecutive commands that are delimited by pipe "I" characters. The pipe character indicates to the data intake and query system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, a chart, a metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
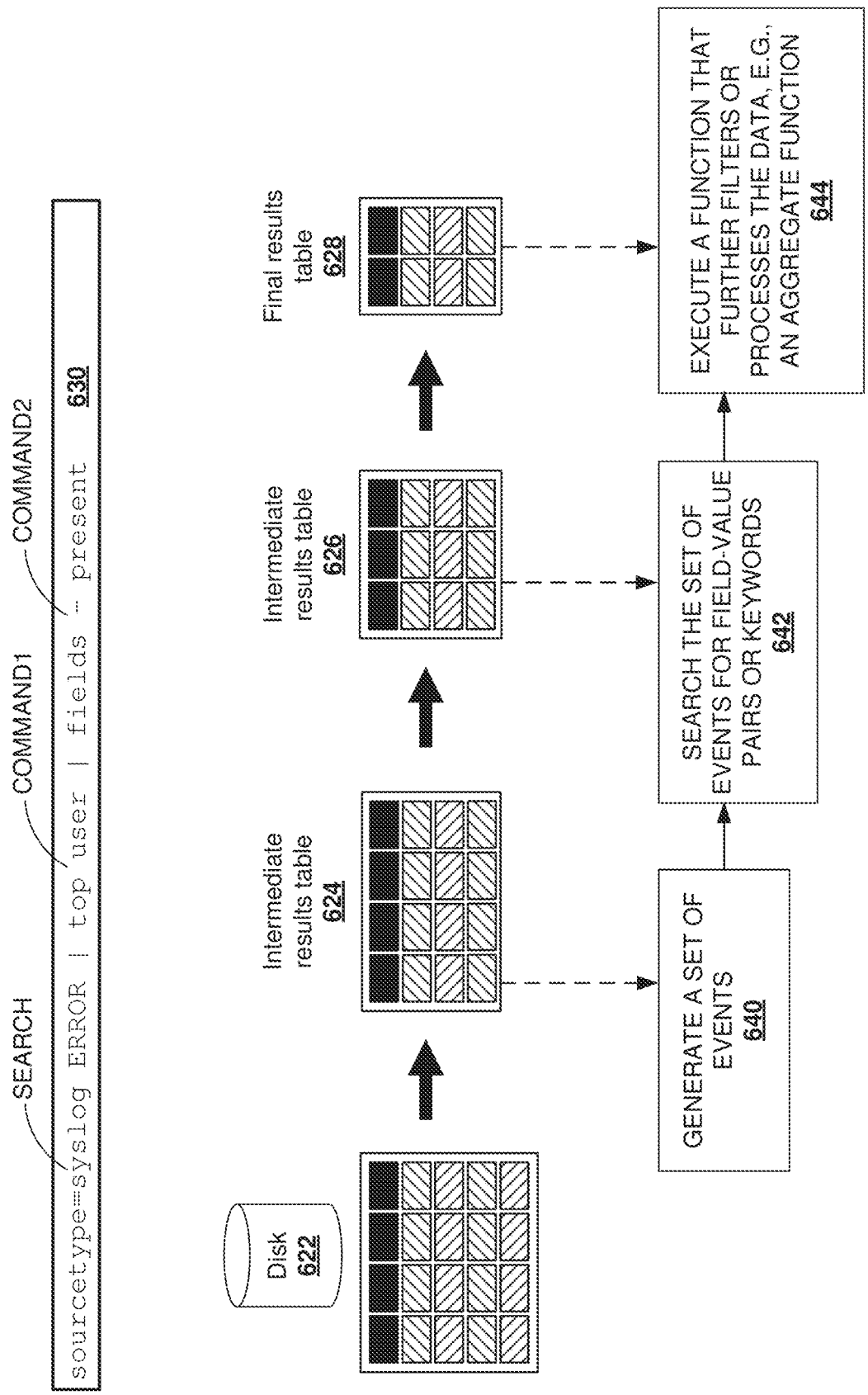
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query 630 comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query 630 can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of query 630 removes the column that shows the percentage, thereby, leaving a final results table 628 without a percentage column. In different embodiments, other query languages, such as the Structured Query Language ("SQL"), can be used to create a query 630.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store 208 or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
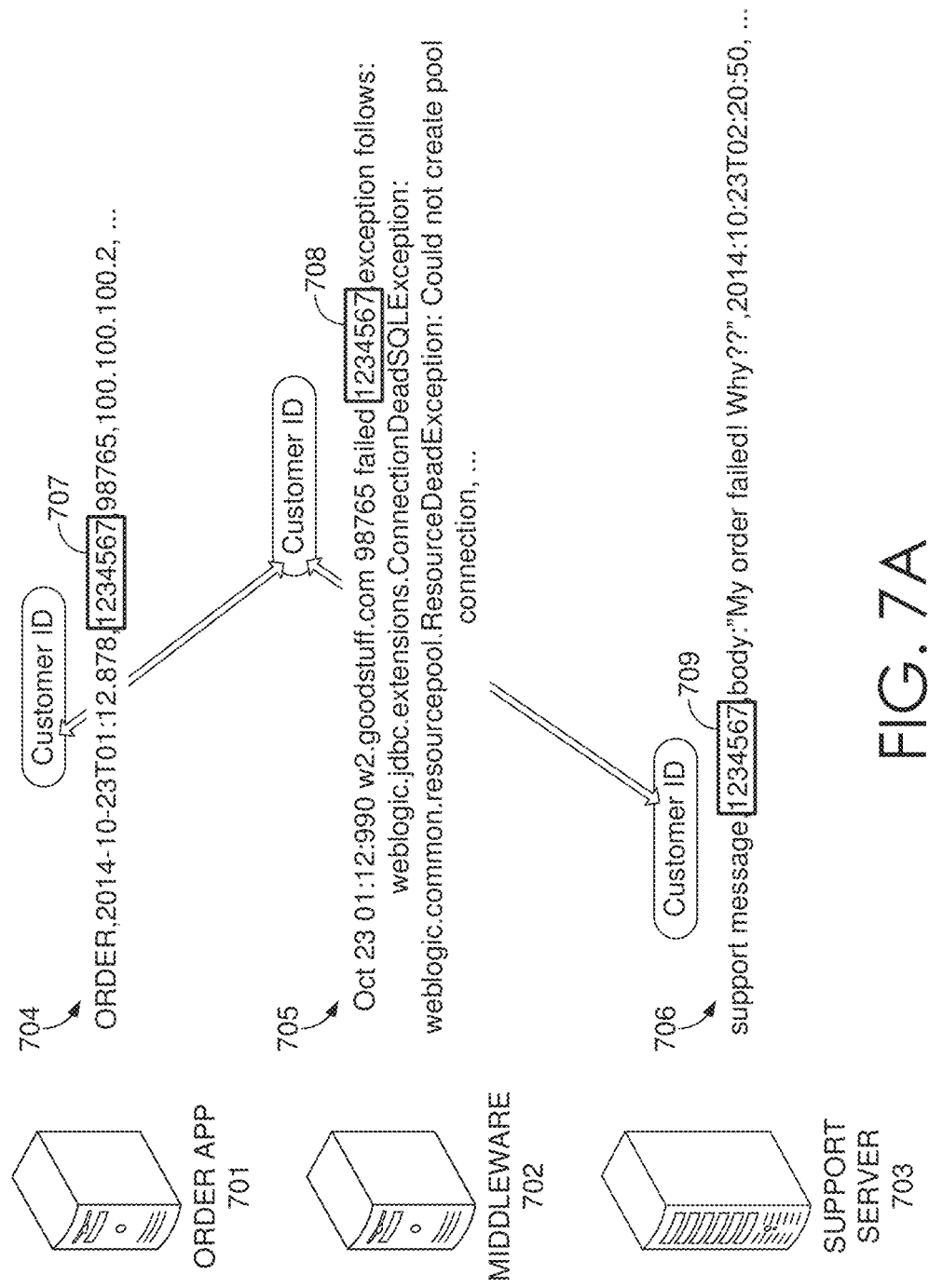
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program (e.g., order app 701) running on the user's system. In this example, the order was not delivered to the vendor's server due to a resource exception at the destination server that is detected by the middleware code (e.g., middleware 702). The user then sends a message to the customer support server (e.g., support server 703) to complain about the order failing to complete. The three systems 701, 702, and 703 are disparate systems that do not have a common logging format. The order app 701 sends log data 704 to the data intake and query system 108 in one format, the middleware code 702 sends error log data 705 in a second format, and the support server 703 sends log data 706 in a third format.

Using the log data received at one or more indexers 206 from the three systems 701, 702, 703, the vendor can uniquely obtain an insight into user activity, user experience, and system behavior. The search head 210 allows the vendor's administrator to search the log data from the three systems 701, 702, 703 that one or more indexers 206 are responsible for searching, thereby obtaining correlated information, such as the order number and corresponding customer ID number of the person placing the order. The data intake and query system 108 also allows the administrator to see a visualization of related events via a user interface (UI). The administrator can query the search head 210 for customer ID field value matches across the log data from the three systems 701, 702, 703 that are stored at the one or more indexers 206. The customer ID field value exists in the data gathered from the three systems 701, 702, 703, but the customer ID field value may be located in different areas of the data given differences in the architecture of the systems 701, 702, 703. There is a semantic relationship between the customer ID field values generated by the three systems 701, 702, 703. The search head 210 requests events from the one or more indexers 206 to gather relevant events from the three systems 701, 702, 703. The search head 210 then applies extraction rules to the events in order to extract field values that it can correlate. The search head 210 may apply a different extraction rule to each set of events from each system when the event format differs among systems. In this example, the UI can display to the administrator the events corresponding to the common customer ID field values 707, 708, and 709, thereby providing the administrator with insight into a customer's experience.

Note that query results can be returned to a client, a search head 210, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
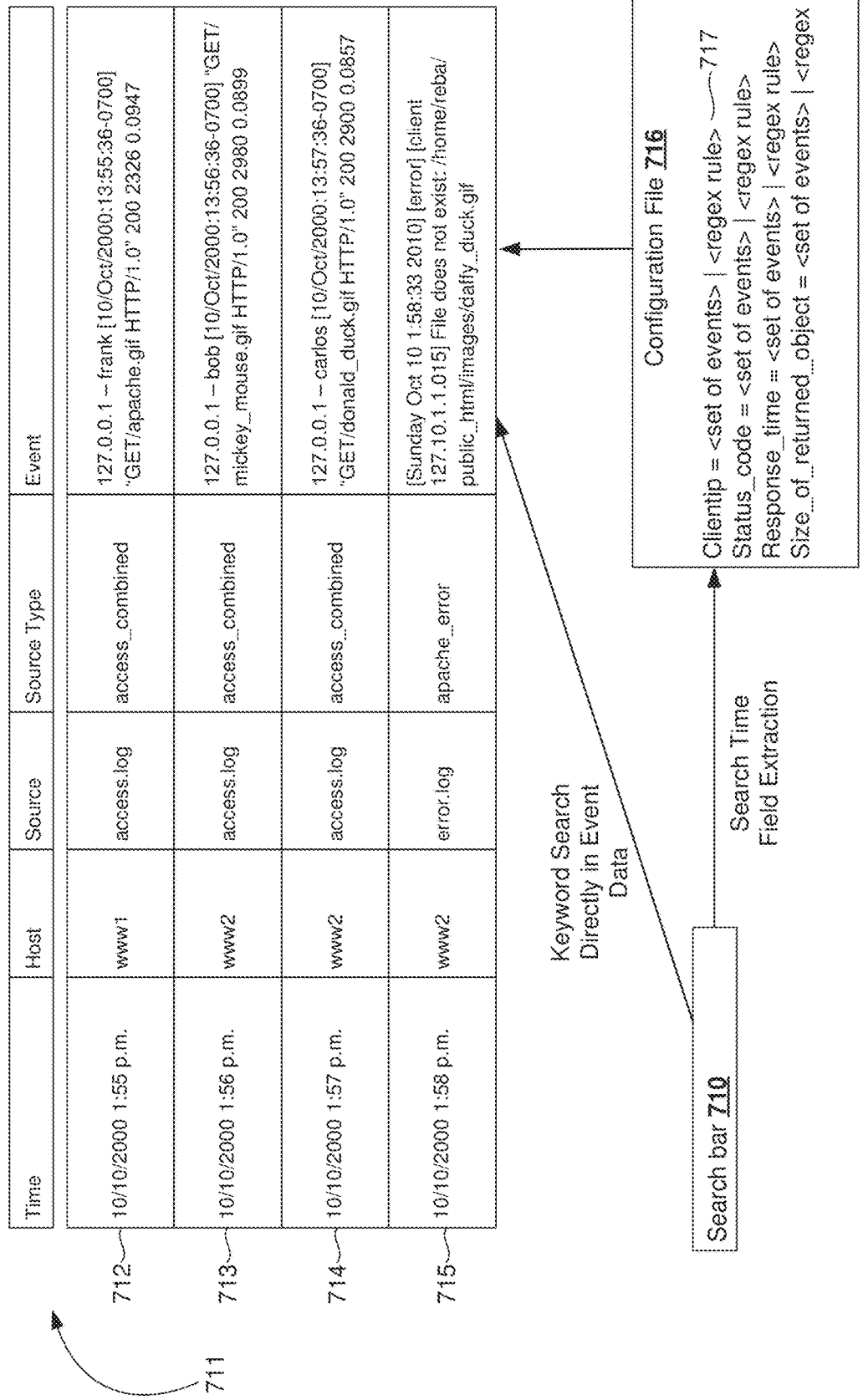
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into a search bar 710 that includes only keywords (also known as "tokens"), e.g., the keyword "error" or "warning", the query search engine of the data intake and query system 108 searches for those keywords directly in the event data 711 stored in the raw record data store. Note that while FIG. 7B only illustrates four events 712, 713, 714, 715, the raw record data store (corresponding to data store 208 in FIG. 2) may contain records for millions of events.

As disclosed above, an indexer 206 can optionally generate a keyword index to facilitate fast keyword searching for event data. The indexer 206 includes the identified keywords in an index, which associates each stored keyword with reference pointers to events containing that keyword (or to locations within events where that keyword is located, other location identifiers, etc.). When an indexer 206 subsequently receives a keyword-based query, the indexer 206 can access the keyword index to quickly identify events containing the keyword. For example, if the keyword "HTTP" was indexed by the indexer 206 at index time, and the user searches for the keyword "HTTP", the events 712, 713, and 714, will be identified based on the results returned from the keyword index. As noted above, the index contains reference pointers to the events containing the keyword, which allows for efficient retrieval of the relevant events from the raw record data store.

If a user searches for a keyword that has not been indexed by the indexer 206, the data intake and query system 108 would nevertheless be able to retrieve the events by searching the event data for the keyword in the raw record data store directly as shown in FIG. 7B. For example, if a user searches for the keyword "frank", and the name "frank" has not been indexed at index time, the data intake and query system 108 will search the event data directly and return the first event 712. Note that whether the keyword has been indexed at index time or not, in both cases the raw data of the events 712-715 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system 108 advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system 108 determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 716 during the execution of the search as shown in FIG. 7B.

Configuration file 716 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface (GUI). The data intake and query system 108 would then generate a regular expression that extracts those fields from similar events and store the regular expression as an extraction rule for the associated field in the configuration file 716.

In some embodiments, the indexers 206 may automatically discover certain custom fields at index time and the regular expressions for those fields will be automatically generated at index time and stored as part of extraction rules in configuration file 716. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 716 to event data that it receives from indexers 206. Indexers 206 may apply the extraction rules from the configuration file 716 to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one or more embodiments, the extraction rule in the configuration file 716 will also need to define the type or set of events that the extraction rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 715 also contains a "clientip" field, however, the "clientip" field is in a different format from the events 712, 713, and 714. To address the discrepancies in the format and content of the different types of events, the configuration file 716 will also need to specify the set of events that an extraction rule 717 applies to, e.g., extraction rule 717 specifies a rule for filtering by the type of event and contains a regular expression for parsing out the field value. Accordingly, each extraction rule 717 will pertain to only a particular type of event. If a particular field, e.g., "clientip", occurs in multiple events, each of those types of events would need its own corresponding extraction rule 717 in the configuration file 716 and each of the extraction rules 717 would comprise a different regular expression to parse out the associated field value. The most common way to categorize events is by source type because events generated by a particular source can have the same format.

The field extraction rules 717 stored in configuration file 716 perform search-time field extractions. For example, for a query that requests a list of events with source type "access_combined" where the "clientip" field equals "127.0.0.1," the query search engine would first locate the configuration file 716 to retrieve extraction rule 717 that would allow it to extract values associated with the "clientip" field from the event data where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, the events 712, 713, and 714 would be returned in response to the user query. In this manner, the search engine can service queries containing field criteria in addition to queries containing keyword criteria (as explained above).

The configuration file 716 can be created during indexing. It may either be manually created by the user or automatically generated with certain predetermined field extraction rules 717. As discussed above, the events may be distributed across several indexers 206, wherein each indexer 206 may be responsible for storing and searching a subset of the events contained in a corresponding data store. In a distributed indexer system, each indexer 206 would need to maintain a local copy of the configuration file 716 that is synchronized periodically across the various indexers 206.

The ability to add schema to the configuration file 716 at search time results in increased efficiency. A user can create new fields at search time and simply add field definitions to the configuration file 716. As a user learns more about the data in the events, the user can continue to refine the late-binding schema by adding new fields, deleting fields, or modifying the field extraction rules in the configuration file 716 for use the next time the schema is used by the system. Because the data intake and query system 108 maintains the underlying raw data and uses late-binding schema for searching the raw data, it enables a user to continue investigating and learn valuable insights about the raw data long after data ingestion time.

The ability to add multiple field definitions to the configuration file 716 at search time also results in increased flexibility. For example, multiple field definitions can be added to the configuration file 716 to capture the same field across events generated by different source types. This allows the data intake and query system 108 to search and correlate data across heterogeneous sources flexibly and efficiently.

Further, by providing the field definitions for the queried fields at search time, the configuration file 716 allows the record data store to be field searchable. In other words, the raw record data store can be searched using keywords as well as fields, wherein the fields are searchable name/value pairings that distinguish one event from another and can be defined in configuration file 716 using extraction rules 717. In comparison to a search containing field names, a keyword search does not need the configuration file 716 and can search the event data directly as shown in FIG. 7B.

It should also be noted that any events filtered out by performing a search-time field extraction using a configuration file 716 can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
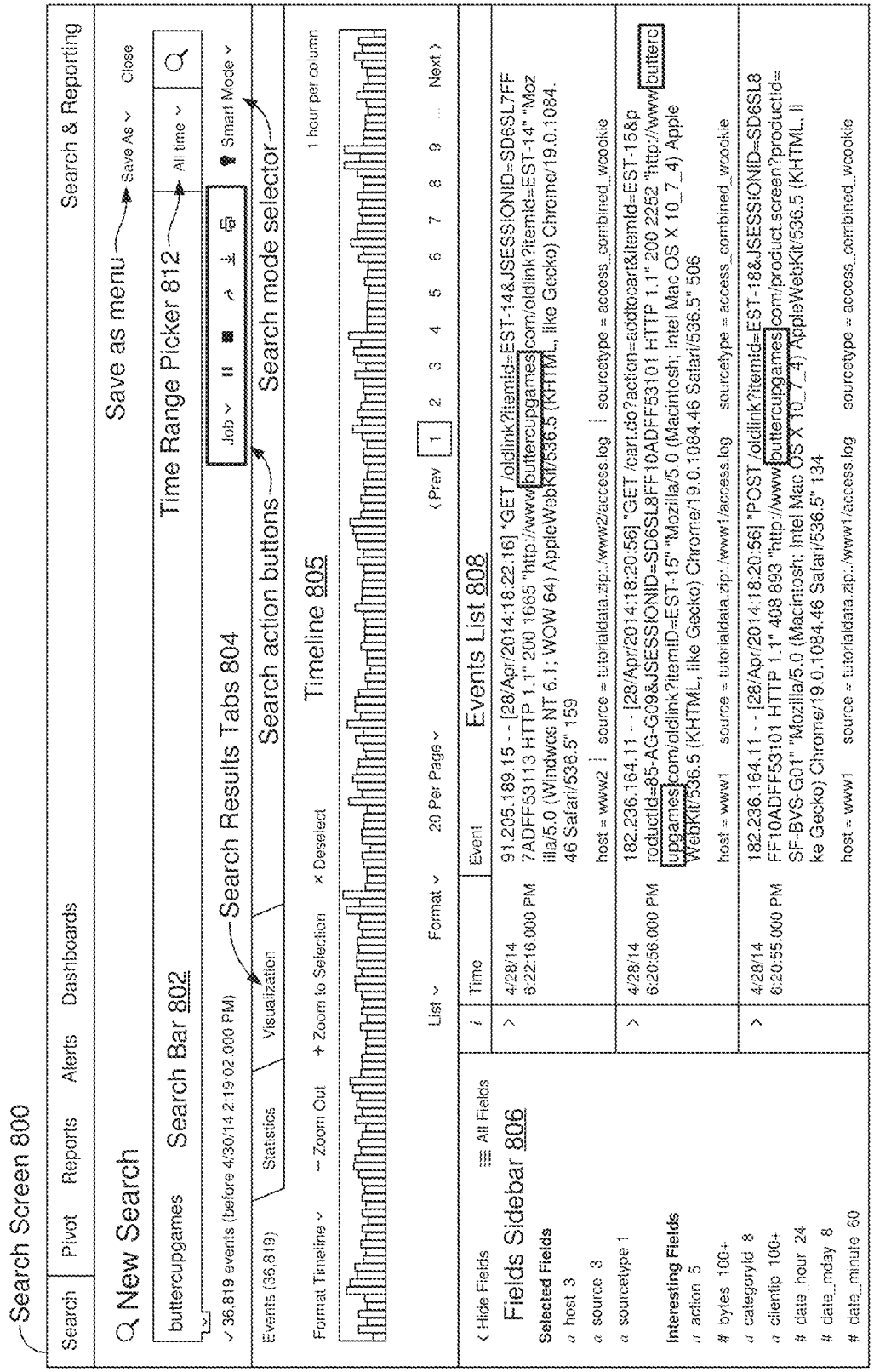
FIG. 8A is an interface diagram of an example user interface for a search screen, in accordance with example embodiments.

FIG. 8A is an interface diagram of an example UI for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The interactive field picker 806 may be displayed to a user in response to the search being executed and allows the user to further analyze the search results based on the fields in the events of the search results. The interactive field picker 806 includes field names that reference fields present in the events in the search results. The interactive field picker 806 may display any Selected Fields that a user has pre-selected for display (e.g., host, source, sourcetype) and may also display any Interesting Fields that the data intake and query system 108 determines may be interesting to the user based on pre-specified criteria (e.g., action, bytes, categoryid, clientip, date_hour, date_mday, date_minute, etc.). The interactive field picker 806 also provides an option to display field names for all the fields present in the events of the search results using the All Fields control.

Each field name in the interactive field picker 806 has a value type identifier to the left of the field name, such as value type identifier. A value type identifier identifies the type of value for the respective field, such as an "a" for fields that include literal values or a "#" for fields that include numerical values.

Each field name in the interactive field picker 806 also has a unique value count to the right of the field name, such as unique value count. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent and specify a set of fields that are associated with the events. Thus, a user can retrieve and use the "e-mails sent" data model object to quickly search source data for events relating to sent e-mails, and may be provided with a listing of the set of fields relevant to the events in a UI screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields that are not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation UIs, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the GUI of the report editor may enable a user to define reporting criteria for the report using the fields associated with the selected data model object, and the events used to generate the report may be constrained to the events that match, or otherwise satisfy, the search constraints of the selected data model object.

Figure 9:
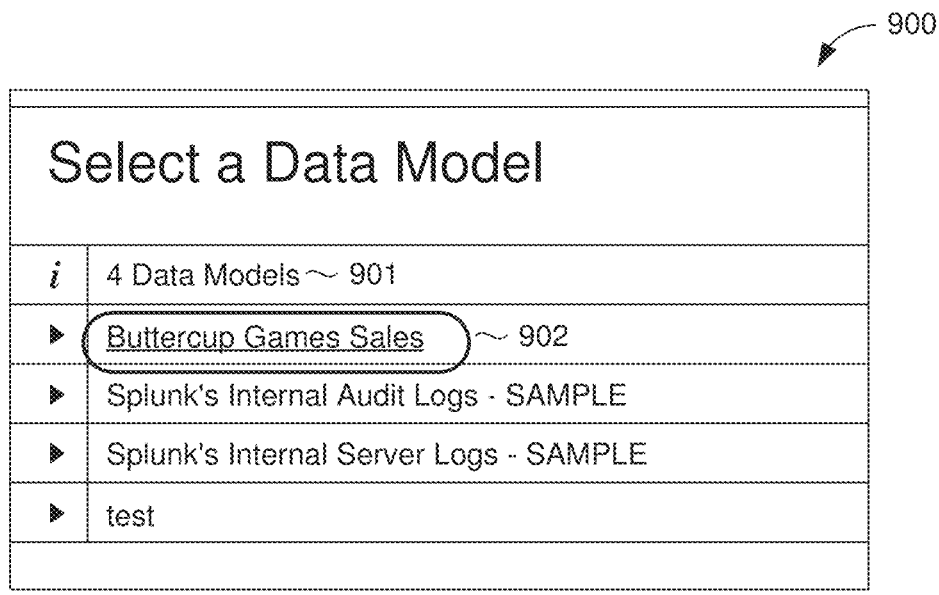
FIGS. 9 and 10 are interface diagrams of example report generation user interfaces, in accordance with example embodiments.

The selection of a data model object for use in driving a report generation may be facilitated by a data model object selection interface. FIG. 9 illustrates an example interactive data model selection GUI 900 of a report editor that displays a listing of available data models 901. The user may select one of the data models 902.

Figure 10:
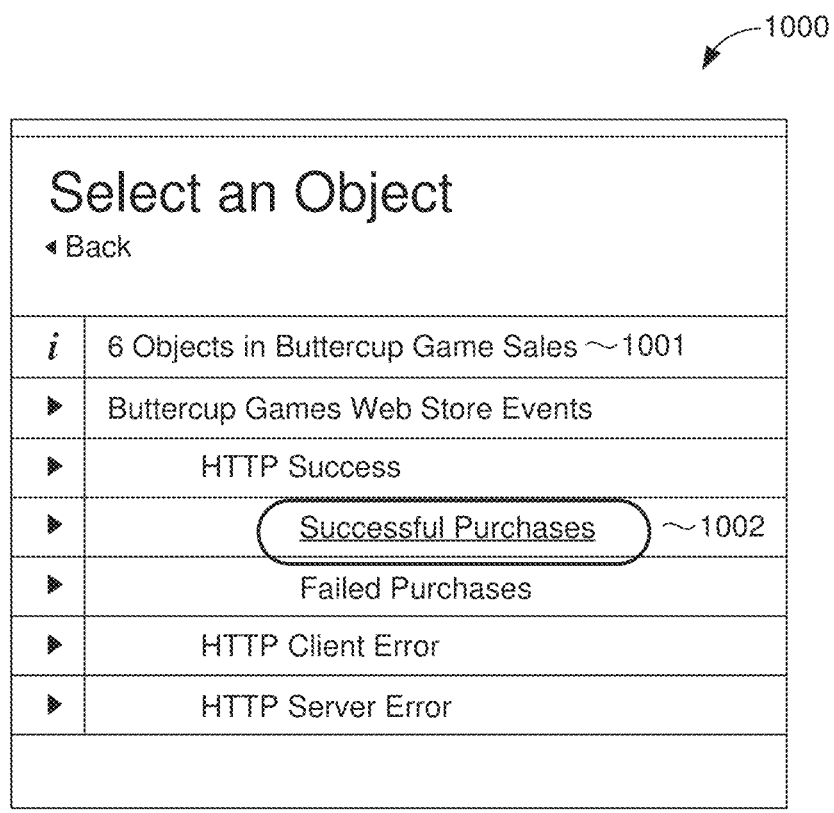

FIG. 10 illustrates an example data model object selection GUI 1000 that displays available data objects 1001 for the selected data object model 902. The user may select one of the displayed data model objects 1002 for use in driving the report generation process.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system 108 also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

Figure 11:
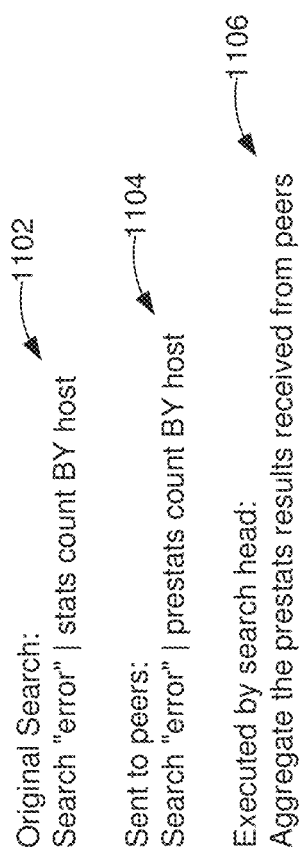
FIG. 11 is an example search query received from a client and executed by search peers, in accordance with example embodiments.

To facilitate faster query processing, a query can be structured such that multiple indexers 206 perform the query in parallel, while aggregation of search results from the multiple indexers 206 is performed locally at the search head 210. For example, FIG. 11 is an example search query received from a client and executed by search peers, in accordance with example embodiments. FIG. 11 illustrates how a search query 1102 received from a client at a search head 210 can split into two phases, including: (1) subtasks 1104 (e.g., data retrieval or simple filtering) that may be performed in parallel by indexers 206 for execution, and (2) a search results aggregation operation 1106 to be executed by the search head 210 when the results are ultimately collected from the indexers 206.

During operation, upon receiving search query 1102, a search head 210 determines that a portion of the operations involved with the search query 1102 may be performed locally by the search head 210. The search head 210 modifies search query 1102 by substituting "stats" (create aggregate statistics over results sets received from the indexers at the search head) with "prestats" (create statistics by the indexer from local results set) to produce search query 1102, and then distributes search query 1102 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head 210 may distribute the full search query 1102 to the search peers as illustrated in FIG. 6A, or may alternatively distribute a modified version (e.g., a more restricted version) of the search query 1102 to the search peers. In this example, the indexers 206 are responsible for producing the results and sending them to the search head 210. After the indexers 206 return the results to the search head 210, the search head 210 aggregates the received results at the search results aggregation operation 1106 to form a single search result set. By executing the query in this manner, the system effectively distributes the computational operations across the indexers 206 while minimizing data transfers.

2.13.2. Keyword Index

As described above with reference to the flow charts in FIG. 5A and FIG. 6A, the data intake and query system 108 can construct and maintain one or more keyword indices to quickly identify events containing specific keywords. This technique can greatly speed up the processing of queries involving specific keywords. As mentioned above, to build a keyword index, an indexer 206 first identifies a set of keywords. Then, the indexer 206 includes the identified keywords in an index, which associates each stored keyword with references to events containing that keyword, or to locations within events where that keyword is located. When an indexer 206 subsequently receives a keyword-based query, the indexer 206 can access the keyword index to quickly identify events containing the keyword.

2.13.3. High Performance Analytics Store

To speed up certain types of queries, some embodiments of the data intake and query system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the data intake and query system 108 to quickly process queries that seek to determine how many events have a particular value for a particular field. To this end, the data intake and query system 108 can examine the entry in the summarization table to count instances of the specific value in the field without having to go through the individual events or perform data extractions at search time. Also, if the data intake and query system 108 needs to process all events that have a specific field-value combination, the data intake and query system 108 can use the references in the summarization table entry to directly access the events to extract further information without having to search all of the events to find the specific field-value combination at search time.

In some embodiments, the data intake and query system 108 maintains a separate summarization table for each of the above-described time-specific buckets that stores events for a specific time range. A bucket-specific summarization table includes entries for specific field-value combinations that occur in events in the specific bucket. Alternatively, the data intake and query system 108 can maintain a separate summarization table for each indexer 206. The indexer-specific summarization table includes entries for the events in a data store 208 that are managed by the specific indexer 206. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination.

In some cases, when the summarization tables may not cover all of the events that are relevant to a query, the data intake and query system 108 can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of the data intake and query system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index 507B can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index 507B separate from the raw record data store to generate responses to the received queries.

Note that the term "summarization table" or "inverted index" as used herein is a data structure that may be generated by an indexer 206 that includes at least field names and field values that have been extracted and/or indexed from event records. An inverted index 507B may also include reference values that point to the location(s) in the field searchable data store where the event records that include the field may be found. Also, an inverted index 507B may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index 507B is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index 507B. A collection query is not the same as a query that is used to call up or invoke a pre-existing inverted index. In one or more embodiments, a query can comprise an initial step that calls up a pre-generated inverted index on which further filtering and processing can be performed. For example, referring back to FIG. 6B, a set of events can be generated at block 640 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file 716 by specifying the "access_combined" source type and a regular expression rule to parse out the client IP address. Alternatively, the collection query may contain an explicit definition for the field name "clientip" which may obviate the need to reference the configuration file 716 at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers 206 would periodically search through the relevant buckets to update inverted index 722 with event data 723 for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index 722 but may need to perform a statistical query on the data in the inverted index 722. For example, referencing the example of FIG. 7C rather than viewing the fields within summarization table, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index 722, a "stats" query may generate their result sets rapidly from the summarization information available in the inverted index 722 rather than directly scanning event records. For example, the contents of inverted index 722 can be pipelined to a stats query, e.g., a "count" function that counts the number of entries in the inverted index 722 and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the data intake and query system 108 can examine the entry in the inverted index 722 to count instances of the specific value in the field without having to go through the individual events or perform data extractions at search time.

In some embodiments, the data intake and query system 108 maintains a separate inverted index for each of the above-described time-specific buckets that stores events for a specific time range. A bucket-specific inverted index includes entries for specific field-value combinations that occur in events in the specific bucket. Alternatively, the data intake and query system 108 can maintain a separate inverted index for each indexer 206. The indexer-specific inverted index includes entries for the events in a data store 208 that are managed by the specific indexer. Indexer-specific inverted indexes may also be bucket-specific. In at least one or more embodiments, if one or more of the queries is a stats query, each indexer 206 may generate a partial result set from previously generated summarization information. The partial result sets may be returned to the search head 210 that received the query and combined into a single result set for the query As mentioned above, the inverted index 722 can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination. In some embodiments, if summarization information is absent from an indexer 206 that includes responsive event records, further actions may be taken, such as, the summarization information may be generated on the fly, warnings may be provided the user, the collection query operation may be halted, the absence of summarization information may be ignored, or the like, or combination thereof.

In one or more embodiments, an inverted index 722 may be set up to update continually. For example, the query may ask for the inverted index 722 to update its result periodically, e.g., every hour. In such instances, the inverted index 722 may be a dynamic data structure that is regularly updated to include information regarding incoming events.

In some cases, e.g., where a query is executed before an inverted index updates, when the inverted index 722 may not cover all of the events that are relevant to a query, the data intake and query system 108 can use the inverted index 722 to obtain partial results for the events that are covered by inverted index 722, but may also have to search through other events that are not covered by the inverted index 722 to produce additional results on the fly. In other words, an indexer 206 would need to search through event data 723 on the data store 208 to supplement the partial results. These additional results can then be combined with the partial results to produce a final set of results for the query. Note that in typical instances where an inverted index is not completely up to date, the number of events that an indexer 206 would need to search through to supplement the results from the inverted index 722 would be relatively small. In other words, the search to get the most recent results can be quick and efficient because only a small number of event records will be searched through to supplement the information from the inverted index 722. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1. Extracting Event Data Using Posting

In one or more embodiments, if the system needs to process all events that have a specific field-value combination, the system can use the references in the inverted index 722 entry to directly access the events to extract further information without having to search all of the events to find the specific field-value combination at search time. In other words, the data intake and query system 108 can use the reference values to locate the associated event data in the field searchable data store and extract further information from those events, e.g., extract further field values from the events for purposes of filtering or processing or both.

The information extracted from the event data 723 using the reference values can be directed for further filtering or processing in a query using the pipeline search language. The pipelined search language will, in one embodiment, include syntax that can direct the initial filtering step in a query to an inverted index 722. In one embodiment, a user would include syntax in the query that explicitly directs the initial searching or filtering step to the inverted index 722.

Referencing the example in FIG. 7C, if the user determines that she needs the user id fields associated with the client requests from IP address "127.0.0.1," instead of incurring the computational overhead of performing a brand new search or re-generating the inverted index 722 with an additional field, the user can generate a query that explicitly directs or pipes the contents of the already generated inverted index 722 to another filtering step requesting the user ids for the entries in inverted index 722 where the server response time is greater than "0.0900" microseconds. The search engine would use the reference values stored in inverted index 722 to retrieve the event data 723 from the field searchable data store, filter the results based on the "response time" field values and, further, extract the user id field from the resulting event data 723 to return to the user. In the present instance, the user ids "frank" and "carlos" would be returned to the user from the generated results table.

In one embodiment, the same methodology can be used to pipe the contents of the inverted index 722 to a processing step. In other words, the user is able to use the inverted index 722 to efficiently and quickly perform aggregate functions on field values that were not part of the initially generated inverted index 722. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index 722 in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the data intake and query system 108 that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., inverted index 722 to generate the results without any user-involvement that directs the use of the index.

Using the reference values in an inverted index 722 to be able to directly access the event data in the field searchable data store and extract further information from the associated event data for further filtering and processing is highly advantageous because it avoids incurring the computation overhead of regenerating the inverted index 722 with additional fields or performing a new search.

The data intake and query system 108 includes one or more forwarders that receive raw machine data from a variety of input data sources, and one or more indexers 206 that process and store the data in one or more data stores 208. By distributing events among the indexers 206 and data stores 208, the indexers 206 can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head 210 would be able to correlate and synthesize data from across the various buckets and indexers 206.

This feature advantageously expedites searches because instead of performing a computationally intensive search in a centrally located inverted index that catalogues all the relevant events, an indexer 206 is able to directly search an inverted index 722 stored in a bucket associated with the time-range specified in the query. This allows the search to be performed in parallel across the various indexers. Further, if the query requests further filtering or processing to be conducted on the event data referenced by the locally stored bucket-specific inverted index, the indexer 206 is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index 722, or if the search engine automatically determines that using an inverted index 722 would expedite the processing of the query, the indexers 206 will search through each of the inverted indexes 722 associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the data intake and query system 108 can use the bucket-specific inverted index to obtain partial results for the events that are covered by bucket-specific inverted index, but may also have to search through the event data in the bucket associated with the bucket-specific inverted index to produce additional results on the fly. In other words, an indexer 206 would need to search through event data stored in the bucket (that was not yet processed by the indexer for the corresponding inverted index) to supplement the partial results from the bucket-specific inverted index.

Figure 7D:
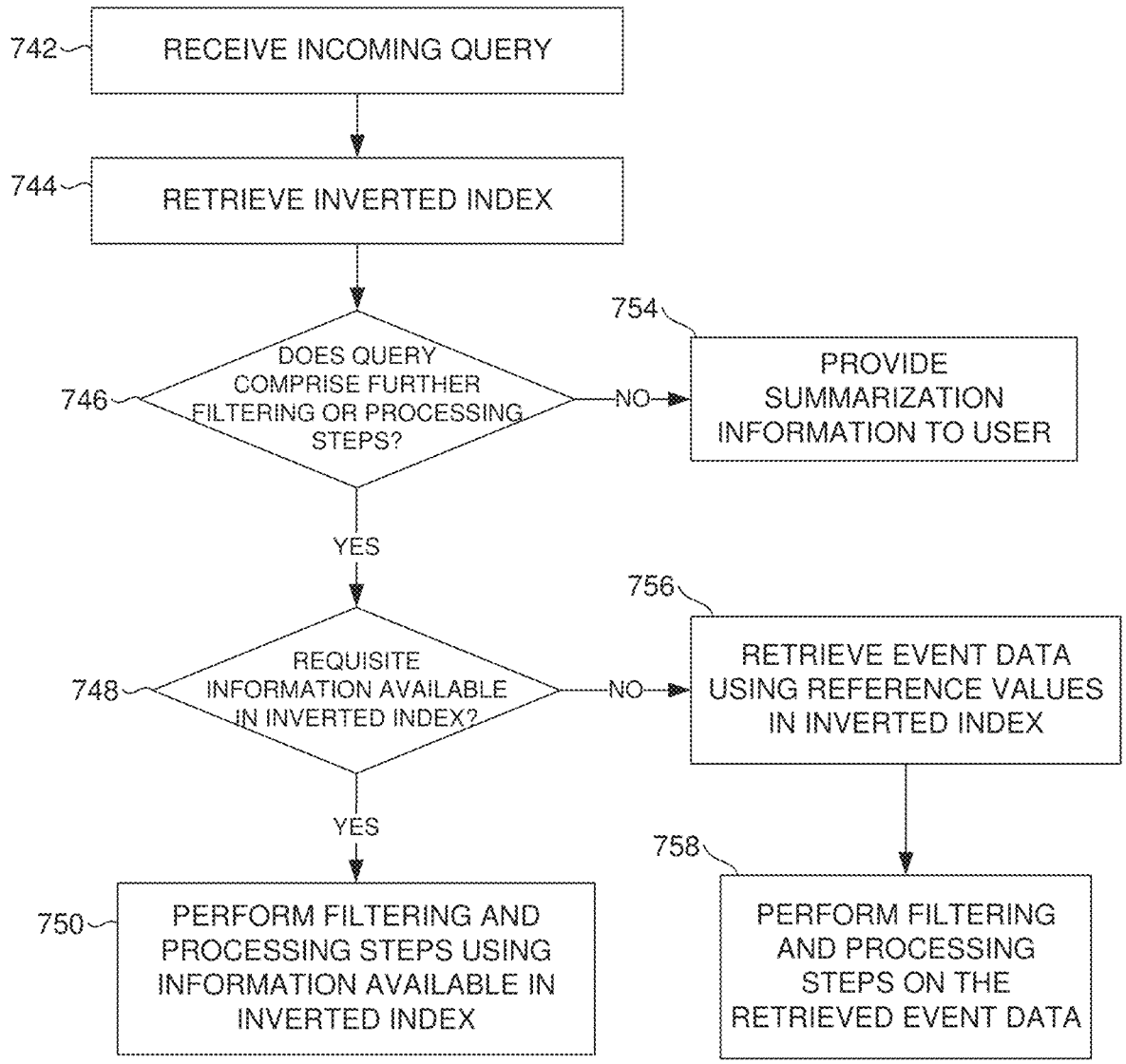
FIG. 7D depicts a flowchart of example use of an inverted index in a pipelined search query, in accordance with example embodiments.

FIG. 7D presents a flowchart illustrating how an inverted index 722 in a pipelined search query can be used to determine a set of event data that can be further limited by filtering or processing in accordance with the disclosed embodiments.

At block 742, a query is received by a data intake and query system 108. In some embodiments, the query can be received as a user generated query entered into a search bar of a graphical user search interface. The search interface also includes a time range control element that enables specification of a time range for the query.

At block 744, an inverted index 722 is retrieved. Note, that the inverted index 722 can be retrieved in response to an explicit user search command inputted as part of the user generated query. Alternatively, the search engine can be configured to automatically use an inverted index 722 if it determines that using the inverted index 722 would expedite the servicing of the user generated query. Each of the entries in an inverted index 722 keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 748, the query engine determines if the requisite information is available in the inverted index. Specifically, the query engine determines whether commands relate to further filtering or processing of the data extracted as part of the inverted index 722 or whether the commands are directed to using the inverted index 722 as an initial filtering step to further filter and process event data referenced by the entries in the inverted index 722. If the query can be completed using data already in the generated inverted index 722, then the further filtering or processing steps, e.g., a "count" number of records function, "average" number of records per hour etc. are performed and the results are provided to the user at block 750.

If, however, the query references fields that are not extracted in the inverted index, then the indexers 206 will access event data pointed to by the reference values in the inverted index 722 to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system 108 can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the data intake and query system 108 stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system 108 provides various schemas, dashboards, and visualizations that simplify developers' tasks to create applications with additional capabilities. One such application is an enterprise security application, such as SPLUNK® ENTERPRISE SECURITY, which performs monitoring and alerting operations and includes analytics to facilitate identifying both known and unknown security threats based on large volumes of data stored by the data intake and query system 108. The enterprise security application provides the security practitioner with visibility into security-relevant threats found in the enterprise infrastructure by capturing, monitoring, and reporting on data from enterprise security devices, systems, and applications. Through the use of the data intake and query system 108 searching and reporting capabilities, the enterprise security application provides a top-down and bottom-up view of an organization's security posture.

The enterprise security application leverages the data intake and query system 108 search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application system provides pre-specified schemas for extracting relevant values from the different types of security-related events and enables a user to define such schemas.

The enterprise security application system can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application system facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to target system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 12A:
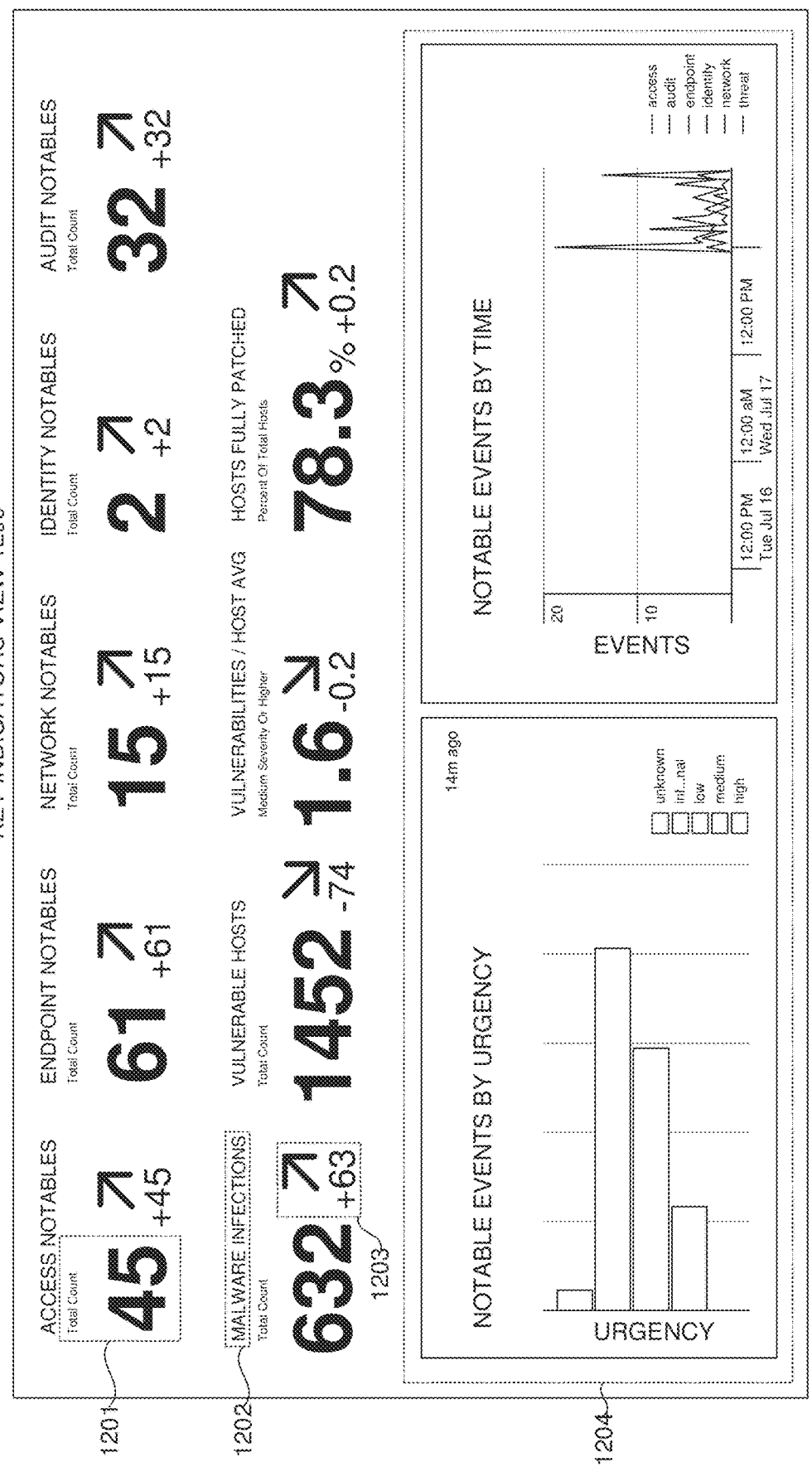
FIG. 12A is an interface diagram of an example user interface of a key indicators view, in accordance with example embodiments.

The enterprise security application system provides various visualizations to aid in discovering security threats, such as a "key indicators view" that enables a user to view security metrics, such as counts of different types of notable events. For example, FIG. 12A illustrates an example key indicators view 1200 that comprises a dashboard, which can display a value 1201, for various security-related metrics, such as malware infections 1202. It can also display a change in a metric value 1203, which indicates that the number of malware infections 1202 increased by 63 during the preceding interval. Key indicators view 1200 additionally displays a histogram panel 1204 that displays a histogram of notable events organized by urgency values, and a histogram of notable events organized by time intervals. This key indicators view 1200 is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 12B:
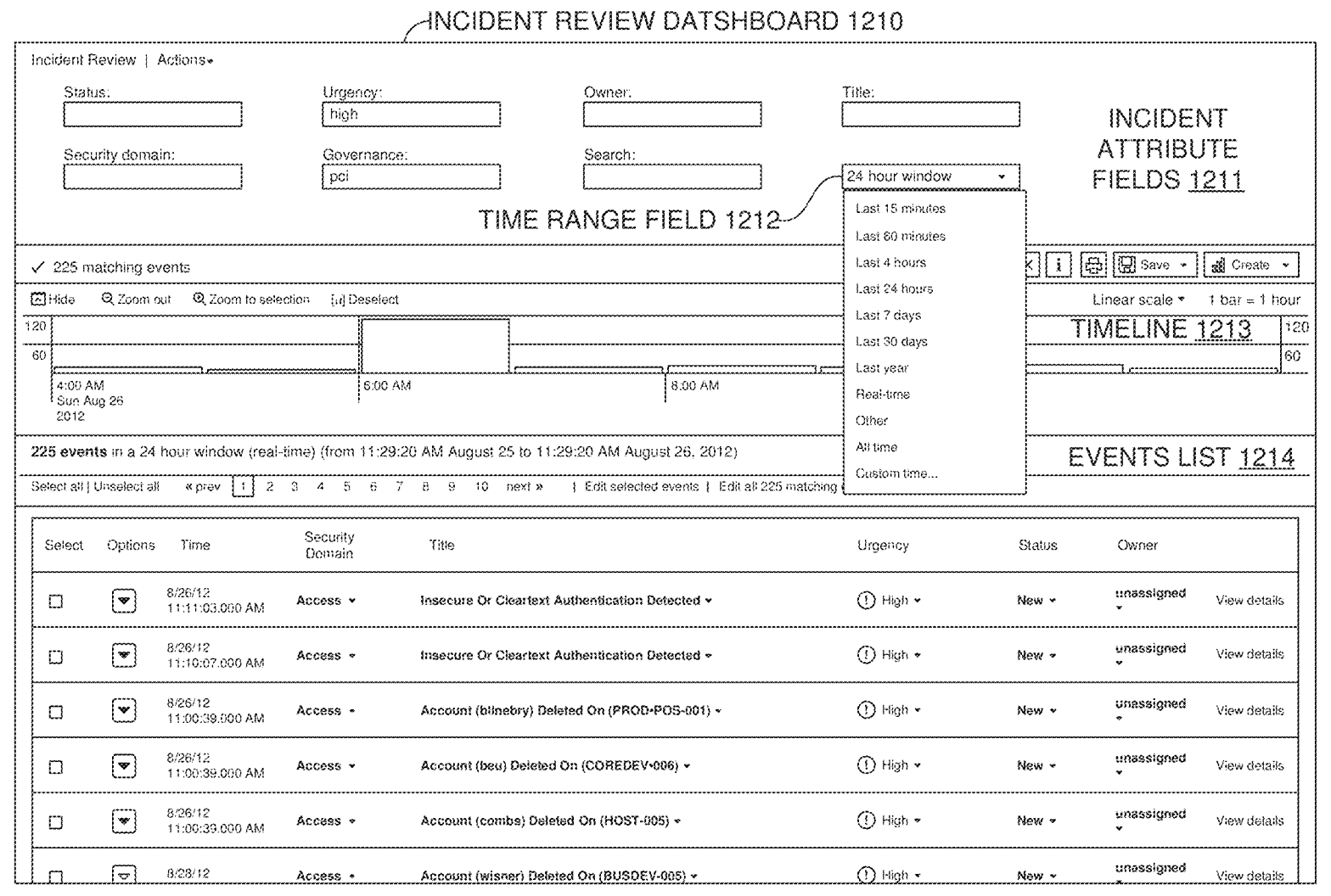

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 12B illustrates an example incident review dashboard 1210 that includes a set of incident attribute fields 1211 that, for example, enables a user to specify a time range field 1212 for the displayed events. It also includes a timeline 1213 that graphically illustrates the number of incidents that occurred in time intervals over the selected time range. It additionally displays an events list 1214 that enables a user to view a list of all of the notable events that match the criteria in the incident attributes fields 1211. To facilitate identifying patterns among the notable events, each notable event can be associated with an urgency value (e.g., low, medium, high, critical), which is indicated in the incident review dashboard 1210. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 12C:
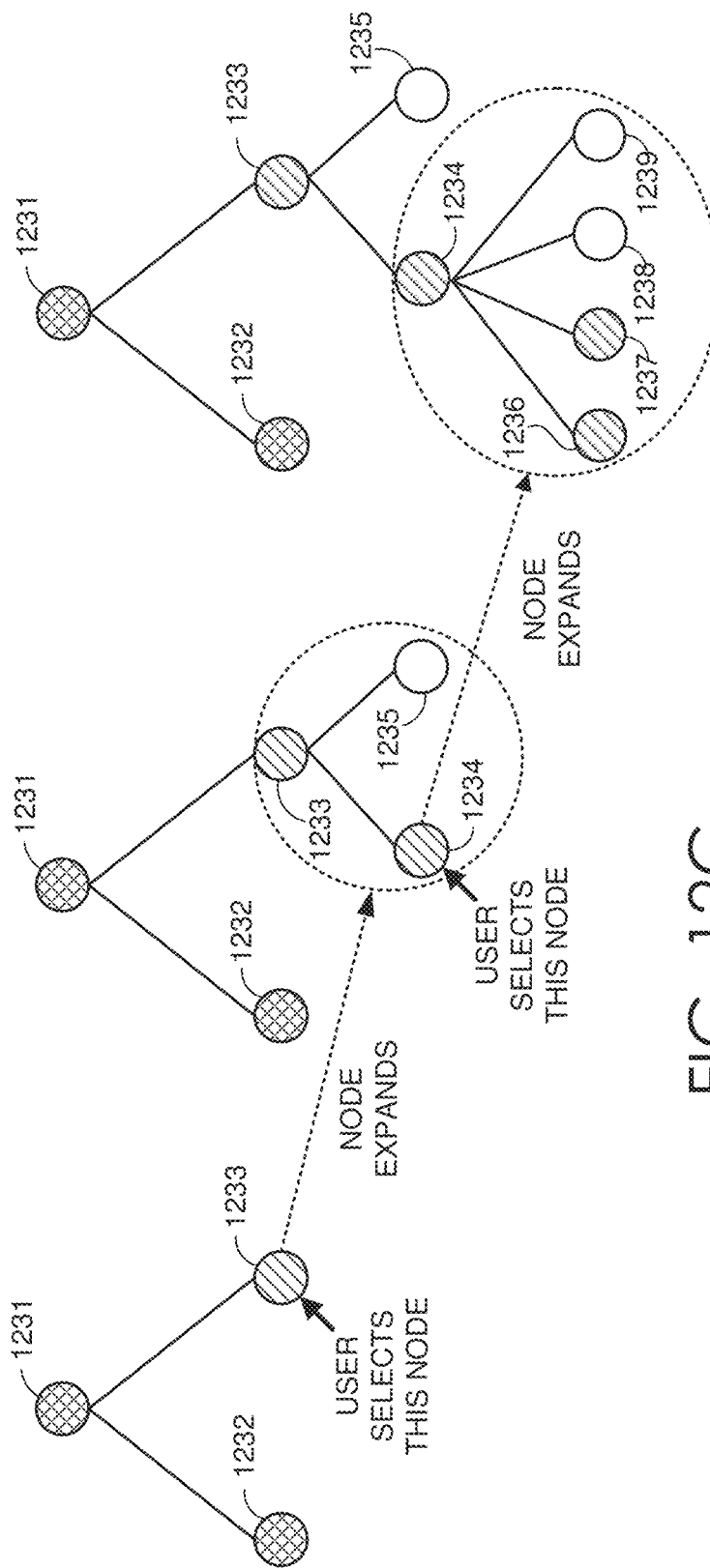
FIG. 12C is a tree diagram of an example a proactive monitoring tree, in accordance with example embodiments.
Figure 12D:
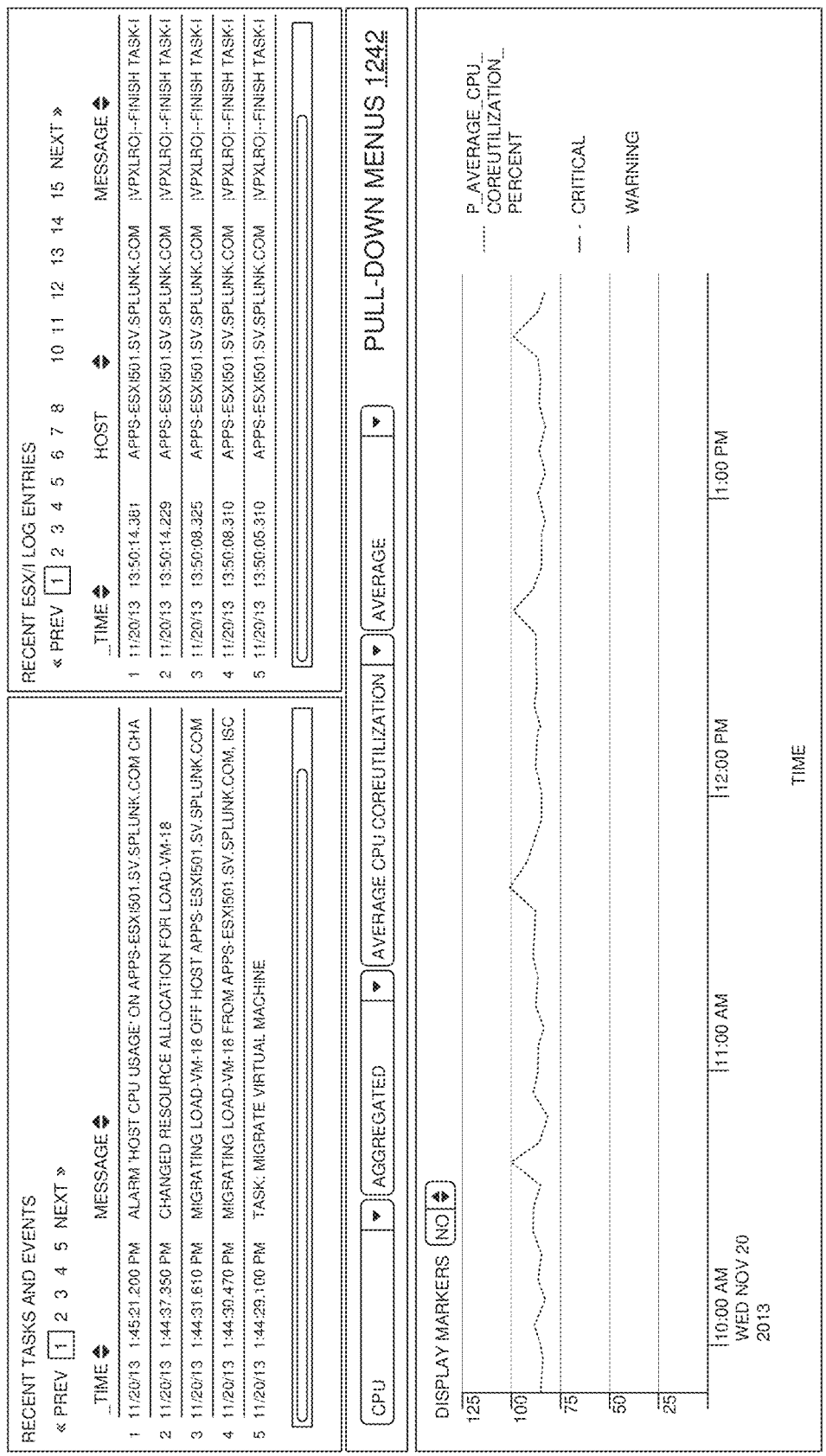
FIG. 12D is an interface diagram of an example a user interface displaying both log data and performance data, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 12C, wherein nodes 1233 and 1234 are selectively expanded. Note that nodes 1231-1239 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

The virtual machine monitoring application also provides a UI that enables a user to select a specific time range and then view heterogeneous data comprising events, log data, and associated performance metrics for the selected time range. For example, the screen illustrated in FIG. 12D displays a listing of recent "tasks and events" and a listing of recent "ESX/I log entries" for a selected time range above a performance-metric graph for "average CPU coreutilization" for the selected time range. Note that a user is able to operate pull-down menus 1242 to selectively display different performance metric graphs for the selected time range. This enables the user to correlate trends in the performance-metric graph with corresponding event and log data to quickly determine the root cause of a performance problem. This UI is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. It Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system 108 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators (KPIs).

One or more KPIs are defined for a service within the IT monitoring application. Each KPI measures an aspect of service performance at a point in time or over a period of time (aspect KPIs). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPIs of the service to indicate an overall health score for the service.

The IT monitoring application facilitates the production of meaningful aggregate KPIs through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPIs can be processed uniformly once they are translated into the common state values using the thresholds. For example, "normal 80% of the time" can be applied across various KPIs. To provide meaningful aggregate KPIs, a weighting value can be assigned to each KPI so that its influence on the calculated aggregate KPI value is increased or decreased relative to the other KPIs.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a comma separated value (CSV), another delimited file, or a search query result set). The import may be GUI-mediated or processed using import parameters from a GUI-based import definition process. Entity definitions in the IT monitoring application can also be associated with a service by means of a service definition rule. Processing the service definition rule results in the matching entity definitions being associated with the service definition. The service definition rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a system available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPIs indicating overall health for defined services and a general KPI section with tiles for KPIs related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPIs in parallel graph lanes. The length of each lane can correspond to a uniform time range, while the width of each lane may be automatically adjusted to fit the displayed KPI data. Data within each lane may be displayed in a user selectable style, such as a line, an area, or a bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

3.0. Customization Tool for Dashboard

The data intake and query system 108 described above is configured to have customizable dashboards. For example, end users and information technology specialists monitoring a system may want to create a customize dashboard based on business and monitoring needs. Rather than the user individually editing each portion of a dashboard or writing all of the backend code for the dashboard, the data intake and query system 108 provides an interface with dragging and dropping functionality. Responsive to a user selecting a particular drop zone location, a selected visualization is sized for the drop zone location and one or more neighboring visualizations are resized. An end user is a user that views the dashboard in the production interface environment. An end user may optionally also modify the dashboard.

Figure 13:
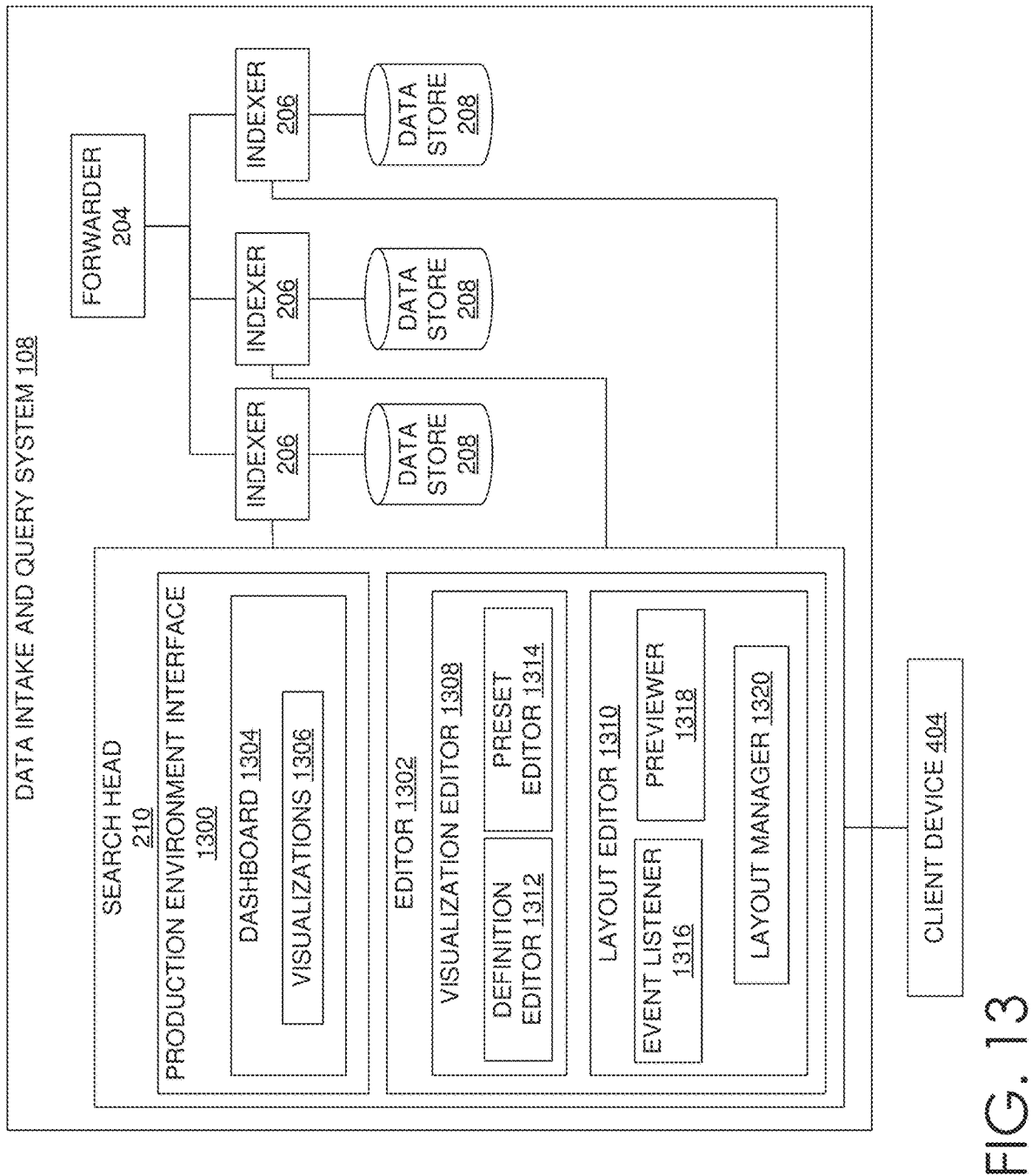
FIG. 13 is a block diagram of an example data intake and query system with a dashboard editor in accordance with example embodiments.

Turning to the Figures, FIG. 13 is a block diagram of an example data intake and query system 108 with a dashboard editor in accordance with example embodiments. The data intake and query system 108 in FIG. 13 is substantively the same as the data intake and query system described above with reference to FIG. 2. The data intake and query system 108 may be communicatively connected to one or more client devices 404, such as the client devices described above with reference to FIG. 4. The client device 404 is configured to receive input from a user and transmit the input to the search head 210.

As shown in FIG. 13, the search head 210 includes a production environment interface 1300 and an editor 1302. All, a part of, or none of the production environment interface 1300 and/or the editor 1302 may execute on the client device 404. The production environment interface 1300 is an interface that displays a dashboard 1304.

A dashboard 1304 is a graphical user interface with a collection of visualizations 1306 displayed in a single view. Through the visualizations 1306, the dashboard 1304 organizes underlying data (e.g., from one or more data sources, analytics tools of the data intake and query system 108, and/or the data stores 208) into a single interface for display the user. The dashboard 1304 may include multiple views. A view is a set of visualizations that are displayed concurrently in a single window of the dashboard. In one or more embodiments, the dashboard in the production environment interface only displays a single view in a window concurrently. For example, a view may be defined for different groups of target systems being monitored, or for different classifications of data.

The visualizations 1306 may be various forms of charts (e.g., histogram charts, graphs, donut charts, circle charts, timelines, etc.), lists, tables, and other discrete forms of visual information communication, that provide information to a user. In some embodiments, each visualization is discrete from other visualizations. Specifically, although the visualization may be related to other visualizations, the information communicated in the visualization is independent of the location of the visualization within the dashboard. Through the dashboard, users may identify relationships between metrics, identify trends, and determine when problems or issues may exist.

In the production environment interface 1300, the dashboard 1304 is not modifiable with respect to the layout or visualizations in at least some embodiments. In the production environment interface 1300, the dashboard 1304 is populated using data. For example, the dashboard 1304 may be continually updated as data is received.

Continuing with the search head 210, the search head 210 further includes an editor 1302. The editor 1302 is a graphical user interface and underlying software for creating an updated dashboard. Creation may be a generation of a new dashboard or a generation of an updated dashboard from an existing dashboard. The editor 1302 includes a visualization editor 1308 and a layout editor 1310. The visualization editor 1308 is an editor for updating individual visualizations. The visualization editor 1308 includes a graphical user interface and interpretation software for building a visualization.

A visualization may be specified by a definition, preset data, and a visualization type code. The visualization type code is a set of computer instruction code for rendering a visualization of a particular visualization type. Specifically, the visualization type code is configured to receive, as input, parameters of a visualization and output a rendering of the visualization. The parameters may include, for example, the colors and/or color scheme, size, data, and any other parameters of the visualization. The output of the visualization type code is a rendered visualization. The visualization type code is code that specifies how to place the location of lines, shapes, and characters in a visualization of a particular visualization type when provided with a set of input parameters having the data for the visualization. The visualization type is the particular type of chart, list, or other type. The visualization type code may further include instructions for generating a legend for the visualization. For example, a donut chart visualization type has a different visualization type code than any of a table visualization type, circle visualization type, histogram visualization type, or other visualization type.

The definition defines the visualization type, dataset to use for the visualization, style, font colors and a color encoding for the dataset in the visualization, one or more location identifiers within a cell for displayed components of the visualization (e.g., location of text in the visualization), text to display, whether to include legends and labels to add, and other displayed parameters of the visualization. In one or more embodiments, the definition is defined in JSON or extensible markup language (XML) format.

The preset data links the definition and the visualization type code. The preset data references the visualization type code for a particular visualization and translates the components of the definition into input parameters for the visualization type code. In one or more embodiments, the preset data is dependent on the visualization type specified in the definition. An independent preset data may exist for each visualization type included in the definition.

Continuing with the visualization editor 1308, the visualization editor 1308 includes a definition editor 1312 and a preset editor 1314. In one or more embodiments, the definition editor 1312 is a user interface for the user to edit the definition. The preset editor 1314 is a user interface for the user to update the preset data. The editor 1302 may further include an interpreter. The interpreter is computer readable program code that parses the definition and the preset data, to extract information and passes the extracted information to the visualization type code to render the visualization.

The layout editor 1310 includes functionality to modify the layout of the dashboard 1304 based on user input. The layout editor 1310 is a tool that assists a user in updating a dashboard. For example, the layout editor is configured to propagate changes and automatically size and resize visualizations without input from the user. The result of the layout editor 1310 is a simplified interface that provides drag and drop functionality while creating a professional quality dashboard. Upon input to add, move, or remove a visualization, the layout editor 1310 algorithmically adjusts the layout to avoid or mitigate for null space (i.e., where no visualization is present), perform automatic alignment, and maintain sizing requirements of visualizations. Thus, one or more embodiments are directed to an improved and simplified user interface by which a dashboard is customized.

The layout editor 1310 includes an event listener 1316, a previewer 1318, and a layout manager 1320. The event listener 1316 is configured to wait for and handle various user events. User events can include click events, dragging events, and other types of user events. User events may be for a selected visualization and/or an edge. The selected visualization is a visualization that is selected to be added, moved, or removed. The user event for an edge may be an edge dragging event.

The previewer 1318 is a graphical user interface configured to present a preview of the dashboard. A previewer 1318 is a view of the dashboard prior to being put in the production environment interface 1300. In one or more embodiments, prior to receiving a selection to accept a drop zone location for a selected visualization, the previewer 1318 may present a placeholder for a selected visualization in the user interface. A placeholder is a general representation of the visualization that is the same size and shape as the visualization if placed at the drop zone location. The placeholder may be a fuzzy version of the visualization that is a solid shape in which the visualization would appear, or another type of shape.

The layout manager 1320 is a software tool that automatically propagates adjustments to the layout to remainder portions of the dashboard. For example, the layout manager 1320 includes functionality to automatically resize, move, and edit neighboring visualizations based on user input of a selected visualization. The layout manager 1320 is further configured to transmit updates of the dashboard to the previewer.

Figure 14A:
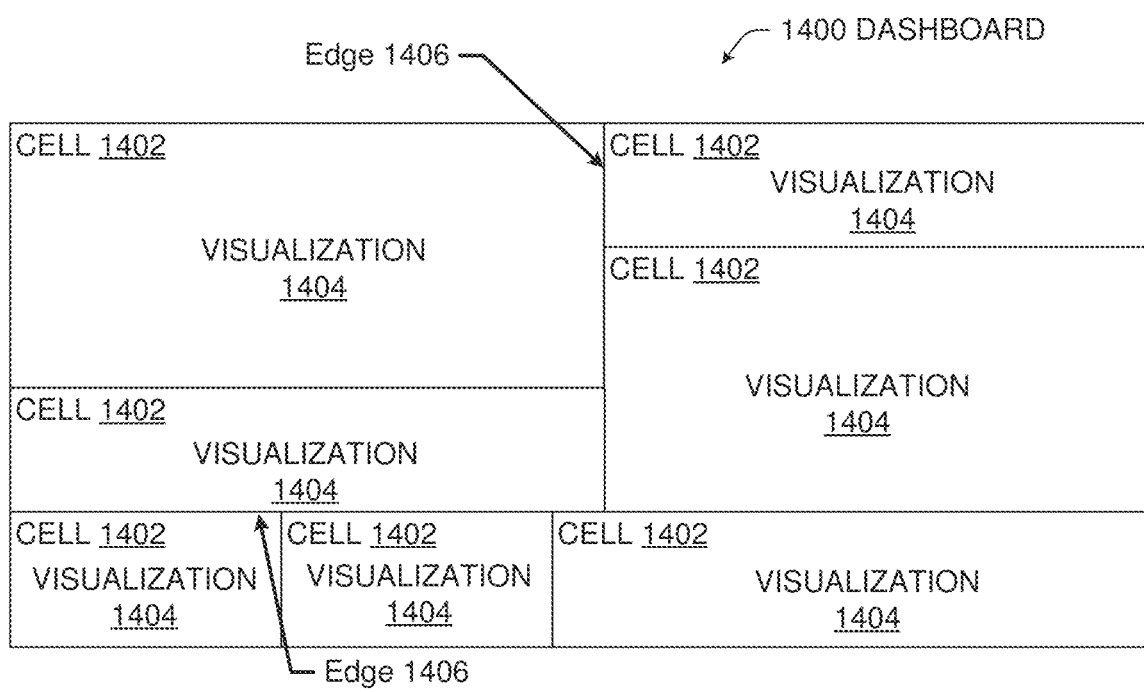
FIG. 14A depicts an example schematic diagram of a dashboard, in accordance with example embodiments.

FIG. 14A depicts an example schematic diagram of a dashboard 1400, in accordance with example embodiments. As shown in FIG. 14A, the dashboard includes multiple cells 1402 in a single view. In one or more embodiments, a one to one correspondence between cells 1402 and visualizations 1404 exists. A cell 1402 is a discrete, dynamically changing location that holds a visualization 1404. The visualization 1404 is the graphics and text inside of the cell 1402. The cell may be a bounding box for the visualization. For example, the cell may be a rectangular shape that just fits the visualization. Thus, the graphics and text for a visualization 1404 may span the size of the cell 1402. In some embodiments, the cell is any shape. The cell 1402 is dynamic in that a cell may be resized, removed, partitioned to create a new cell, and dynamically added as updates to the layout are performed.

The cell 1402 includes edges 1406. Edges 1406 are the boundary on a side of a cell 1402. For example, an edge may be a boundary between neighboring cells. In embodiments in which the cell is rectangular, the cell has four edges.

Edges may be set as hidden or visible in the production environment interface. Visible edges have a border overlaid on the edge. Whereas an edge is a boundary, the border is a visual indicator of the edge 1406 that is displayed to an end user. In one or more embodiments, borders are generated at runtime and when a visualization is loaded. Namely, borders are not saved with the dashboard code.

Although not shown, the dashboard may include additional components. The additional components may include titles, menu options, view selectors, and other graphical options that allow the end user to specify the data presented in the dashboard.

A drop zone location is a location in which a user requests to locate a selected visualization. The drop zone location may be along an edge or on an existing cell 1402. Drop zone location have neighboring cells. A neighboring cell is a cell that shares at least one edge with the drop zone location. For example, if the drop zone location is on an edge, the neighboring cells are cells that have the same edge. If the drop zone location is on a cell, the neighboring cells are the cells that have an edge in common with the cell of the drop zone location. Because a cell 1402 may have multiple edges 1406, the cell 1402 that is a drop one location may also have neighboring cells.

A cell has adjacent cells. Adjacent cells are cells that share an edge with a cell. When a visualization is moved, the adjacent cells may be cells that are adjacent to the moved location of a cell.

As discussed above, a cell 1402 may be a drop zone location. The drop zone location for a cell 1402 may be defined by quadrants. FIG. 14B depicts an example schematic diagram of a cell 1402 partitioned into quadrants 1410, 1412, 1414, 1416, in accordance with example embodiments. As shown in FIG. 14B, the quadrants may be defined as triangles that have vertices in the center of the cell. Each quadrant 1410, 1412, 1414, 1416 corresponds to a particular drop zone location. The drop zone location corresponds to half of a cell.

FIG. 14C depicts an example schematic diagram of a cell 1402 partitioned twice to show the drop zone locations when the drop zone locations are in a cell, in accordance with example embodiments. The top drop zone quadrant 1410 in FIG. 14B corresponds to the top drop zone location 1420 in FIG. 14C. The left drop zone quadrant 1412 in FIG. 14B corresponds to the left drop zone location 1424 in FIG. 14C. The bottom drop zone quadrant 1416 in FIG. 14B corresponds to the bottom drop zone location 1422 in FIG. 14C. The right drop zone quadrant 1414 in FIG. 14B corresponds to the right drop zone location 1426 in FIG. 14C.

FIGS. 14A-C are for example purposes. For example, the layout of FIG. 14A is an example layout of cells to illustrate cell positioning and sizes. By way of another example, although cells are shown as being partitioned into quadrants in FIG. 14B, whereby each quadrant corresponds to half the cell as in FIG. 14C, the cells may be partitioned in virtually any manner to any number of regions, whereby each region corresponds to a drop zone location.

FIGS. 15-20 present flowcharts in accordance with one or more embodiments. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Figure 15:
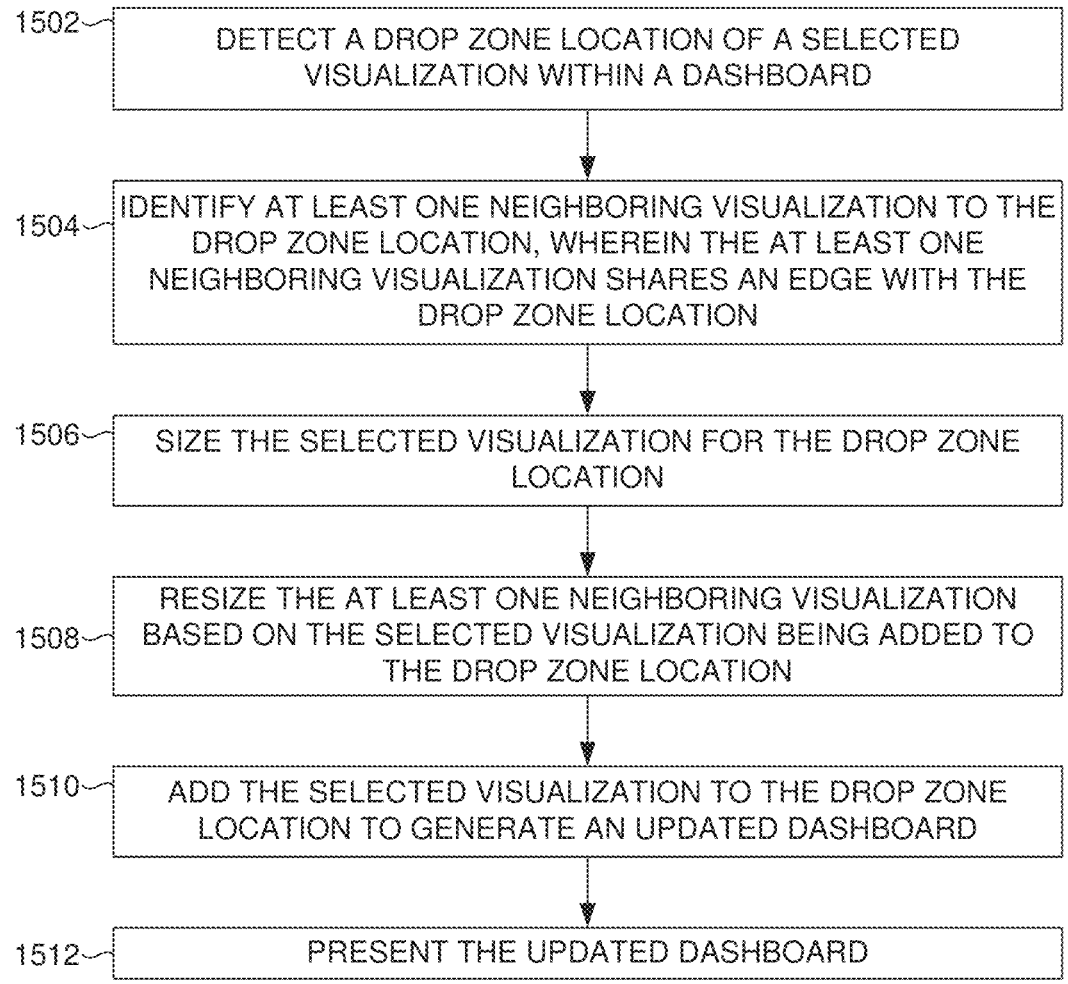
FIG. 15 depicts a flowchart for updating a dashboard, in accordance with example embodiments.

FIG. 15 depicts a flowchart for updating a dashboard, in accordance with example embodiments. The flowchart of FIG. 15 illustrates adding a selected visualization to a drop zone location. In FIG. 15, the selected visualization may be a new visualization or an existing visualization that is moved from a different location. For example, a user may specify a new visualization by adding the definition and preset data to the visualization code. In some embodiments, for the same type of visualization, the user may simply add a new definition that links to the same preset data. Thus, multiple definitions may reference the same preset data. Similarly, the multiple preset data may reference the same visualization type code.

At Block 1502, a drop zone location of a selected visualization within a dashboard is detected. The user may use the interface to select (e.g., with point and click operations) a visualization to be a selected visualization. An event listener may receive the event of the selection and identify the object (i.e., visualization) selected. The visualization that is selected is the selected visualization. As the selected visualization is moved in the dashboard, the previewer shows the movement. Because of a hover event (e.g., the selected visualization is detected as being over a particular location for more than a threshold amount of time) over the drop zone location or a selection event on the drop zone location, the drop zone location of the selected visualization is detected. Other interface widgets may be used for selecting a visualization. For example, the other interface widgets may be drop down boxes, etc. that are configured to receive coordinates of the drop zone location.

At Block 1504, at least one neighboring location to the drop zone location is identified, wherein the at least one neighboring visualization shares an edge with the drop zone location. To identify the at least one neighboring visualization, the one or more edges of the drop zone location are identified. If the drop zone location is on an edge, then the at least one neighboring visualization is any cell that has the same edge as the drop zone location. If the drop zone location is on a cell of the visualization, then the at least one neighboring visualization is the visualization in the cell. The at least one neighboring visualization may also include any visualization that shares an edge with the cell of the drop zone location when the drop zone location is a cell.

At Block 1506, the selected visualization is sized for the drop zone location. A portion of neighboring visualization(s) is reclaimed to create space for the selected visualization.

If the drop zone location is on an edge, then a portion of each of the neighboring visualizations is reclaimed for space for the selected visualization. For example, the portion may be a predefined percentage of the neighboring visualization. The predefined percentage may be a third of each of the neighboring visualizations. The reclaimed space is thus a continuous percentage of the neighboring visualizations. The visualization is sized and shape to fit the space.

If the drop zone location is on a cell, then the size of the selected visualization may be a predefined percentage of the cell. A portion of the cell that is the drop zone location is reclaimed. The predefined percentage for a cell may be different than the predefined percentage when the drop zone location is on an edge. For example, the predefined percentage for the cell may be half of the cell. In some embodiments, a portion of the neighboring cells to the drop zone location cell are also reclaimed as described above. Thus, the visualization is sized and shaped to fit the reclaimed space.

In some embodiments, one or more of the neighboring visualizations are excluded from having space reclaimed or the amount of space reclaimed is reduced based on criteria. For example, the excluded or reduced space neighboring visualizations may be due to minimum size requirements of the neighboring visualization, or that the resulting space would cause an irregular shape. In such a scenario, each of the neighboring visualizations described above refers to the neighboring visualizations that are not excluded and only the reduced space is reclaimed for any reduced space visualizations.

Continuing with the discussion of sizing and shaping a visualization, the created space becomes a cell for the selected visualization. Based on the amount of reclaimed space, the selected visualization is sized and shaped to fit the new cell.

Sizing and shaping the selected visualization may be performed differently for visualizations that are equidistant from the center along two axes as compared to visualization that are not equidistant from the center. Namely, visualizations, such as donut charts and pie charts, are equidistant from the center along two axes. Thus, the sizing and shaping is to scale the visualization along both axes equally according to the minimum of the height and width of the new cell. The location and size of any legend and other text may be changed algorithmically to fit the remaining space in the new cell.

Some visualizations, such as time series charts, histograms, and timelines, are not equidistant from the center for both axes. For visualizations that are not equidistant from the center, the size and shape may be performed individually for the horizontal and the vertical axes. Namely, the horizontal axis of the selected visualization may be scaled to fit the width of the new cell. The vertical axis of the selected visualization is scaled to fit the height of the new cell. The amount of scaling may be performed to save space for any text, legends, and other items that are to be added to the new cell.

At Block 1508, the at least one neighboring visualization is resized based on the selected visualization being added to the drop zone location. Any neighboring visualization that had a portion of the cell reclaimed is resized and shaped to fit the remaining portion of the cell. The resizing and shaping may be performed as discussed above for the selected visualization. Specifically, a determination is made whether the type of visualization is such that the scaling should be performed along both axes by the same amount or independently.

At Step 1510, the selected visualization is added to the drop zone location to generate an updated dashboard. The selected visualization is added to the reclaimed space.

At Block 1512, the updated dashboard is presented. The selected visualization and the neighboring visualization are rendered according to the scaling. Presenting herein includes transmitting to a client device via a network and/or displaying locally or on the client device. Thus, presenting the dashboard may be to display the dashboard and/or transmit the dashboard to the client device for display. Thus, the user can see the updated dashboard.

In one or more embodiments, Blocks 1506, 1508, 1510, and 1512 may be performed concurrently. Further, the underlying software instructions for performing Blocks 1506, 1508, 1510, and 1512 may be overlapping. Thus, while distinct operations are performed, from a computer perspective, the same instructions may perform multiple operations.

Figure 16:
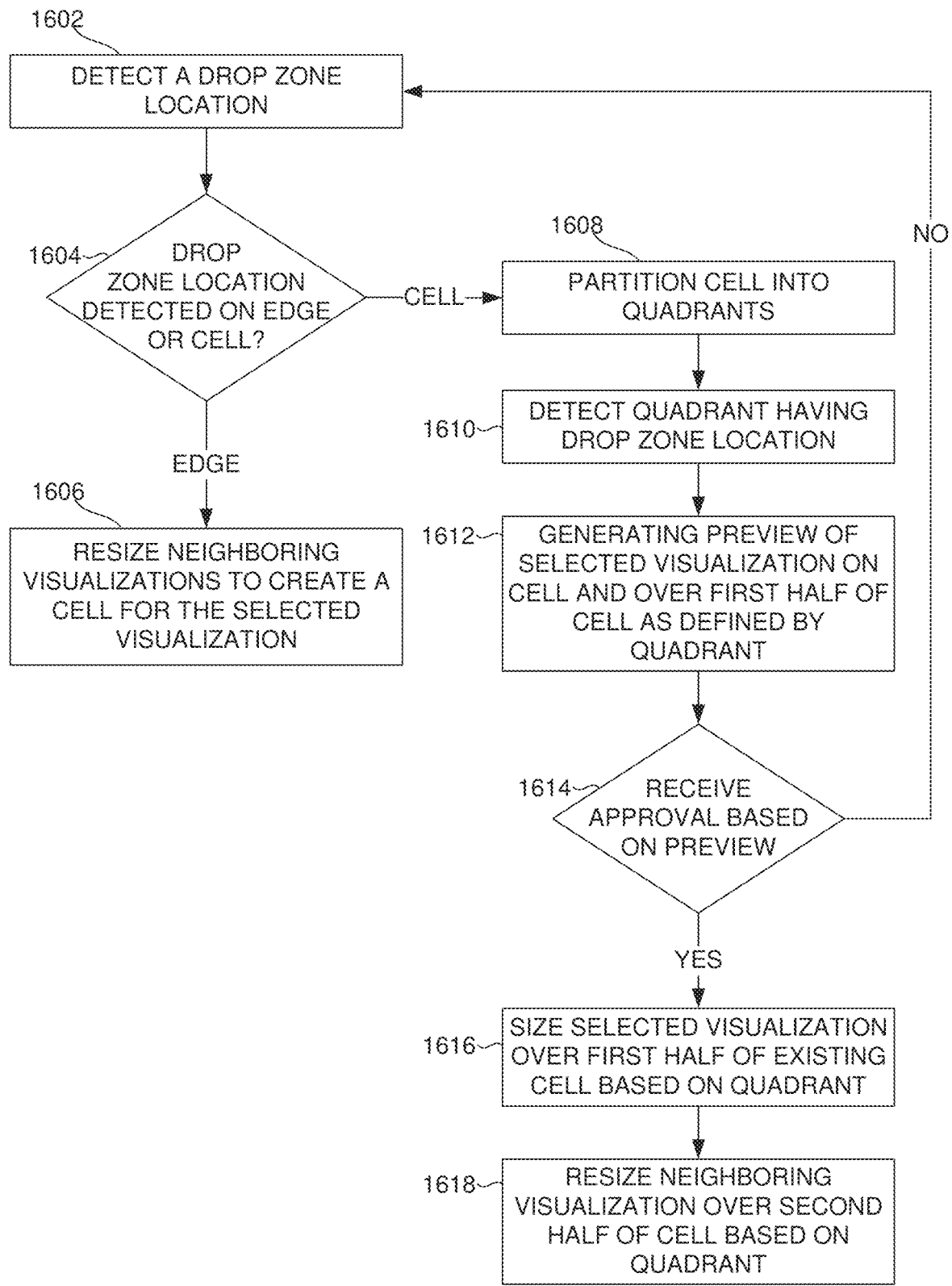
FIG. 16 depicts a flowchart for updating a dashboard based on drop zone location, in accordance with example embodiments.

FIG. 16 depicts a flowchart for updating a dashboard based on drop zone location, in accordance with example embodiments. In particular, FIG. 16 shows a more detailed diagram for when to resize neighboring visualizations in accordance with one or more embodiments. At Block 1602, a drop zone location is detected. Detecting the drop zone location may be performed as discussed above with reference to FIG. 15.

At Block 1604, a determination is made whether the drop zone location is on an edge or on a cell. If the drop zone location is on an edge, then the neighboring visualizations are resized to create a cell for the selected visualization at Block 1606. As discussed below, a preview may be generated and presented prior to resizing. Further, the user may approve the selected visualization at the drop zone location prior to adding the selected visualization to the drop zone location.

In one or more embodiments, if the drop zone location is a cell, the cell is partitioned into quadrants at Block 1608. Partitioning the cell into quadrants may be performed by calculating the lines from the corner of the cell to the opposing corner that is through the center of the cell. At Block 1610, the quadrant having the drop zone location is detected. In one or more embodiments, the same instructions may be used to partition the cell into quadrants as to determine the quadrant having the drop zone location. Namely, rather than determining each of the quadrants, only the quadrants near the drop zone location may be determined as to the location of the drop zone location.

At Block 1612, a preview of the selected visualization on the cell and over a first half of the cell as defined by the quadrant is generated. The preview may include a resizing and reshaping of the neighboring visualizations as discussed in FIG. 15. The preview may further include displaying a placeholder for the selected visualization at the new cell.

At Block 1614, a determination is made whether approval for the preview is received. The determination may be made based on whether an event is received with an indication that the user selected an option to accept or approve the preview. If the preview is not approved, the flow may return to Block 1602. For example, the user may continue to drag the selected visualization around the dashboard and select a different drop location. If the approval is received, the flow may proceed to Block 1616.

In Block 1616, the selected visualization is sized to fit over the first half of the existing cell based on the quadrant. A new cell is created for the first half of the cell, whereby the first half is defined by the quadrant. The selected visualization may be sized and shaped to fit within the new cell, as described above with reference to FIG. 15. Further, the neighboring visualization is resized to fit over the second half of the cell, whereby the second half is defined by the quadrant at Block 1618. The resizing of the neighboring visualization may be performed as discussed above with reference to FIG. 15. The updated dashboard may be generated and presented as described above.

Figure 17:
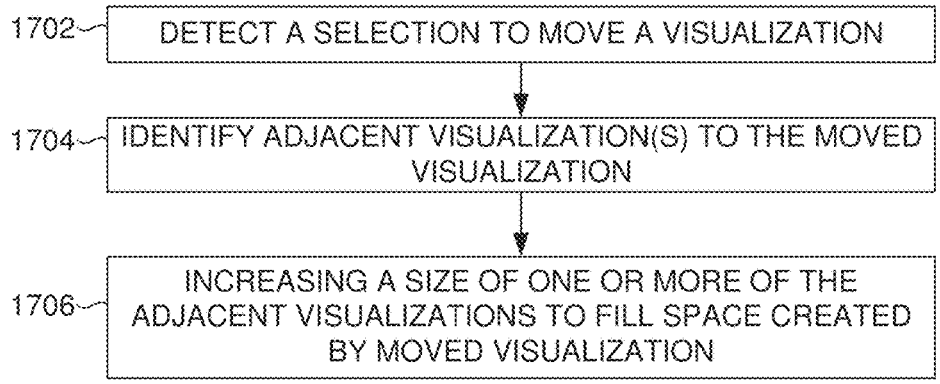
FIG. 17 depicts a flowchart for updating adjacent visualization based on movement of a selected visualization, in accordance with example embodiments.

When a selected visualization is moved, adjacent cells to the cell at the initial location of the selected visualization are updated to fill in the abandoned space. FIG. 17 depicts a flowchart for updating adjacent visualization based on movement of a selected visualization, in accordance with example embodiments. At Block 1702, a selection to move a visualization is detected. An event of a user selecting a visualization and dragging the visualization is received.

At Block 1704, adjacent visualization(s) to the moved visualization are identified. The adjacent visualizations are in adjacent cells to the initial location cell (i.e., a cell at the initial location of the visualization). An adjacent cell is a cell that shares an edge with the initial location cell. Thus, identifying adjacent visualizations may be performed by, for each edge of the initial location cell, determining the adjacent cell that has the same edge. Adjacent cells in which only a portion of the edge is the same may be excluded. Thus, if the same edge of the adjacent cell has a first portion shared with the initial location cell as well as a second portion shared with another cell, the adjacent cell is excluded from resizing at Block 1706.

At Block 1706, the size of one or more of the adjacent visualizations are increased to fill the space created by the moved visualization. The initial location cell is removed, and the adjacent cells are expanded to fill in the void from the removal of the initial location cell. The amount of expansion may be equal amongst the adjacent cells. As another example, the amount of expansion may be proportional to initial size or to make the cells more equal in final size. Other rules for expansion may be used. Further, the adjacent visualizations in the expanded cells are resized to fit the expanded cells. The resizing may be performed according to FIG. 15, whereby the scaling parameter is set to increase the size of the visualization.

Figure 18:
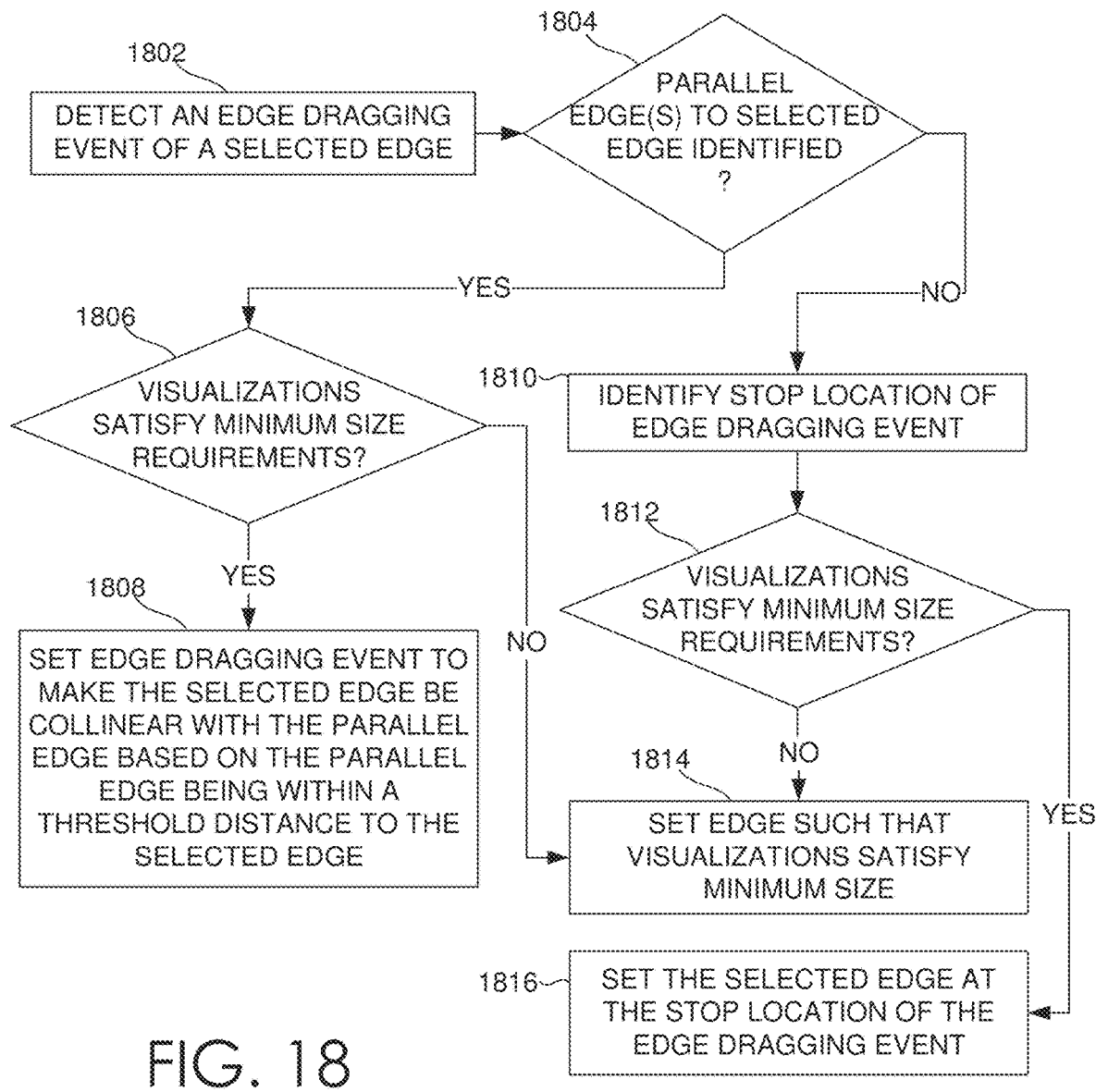
FIG. 18 depicts a flowchart for responding to an edge dragging event, in accordance with example embodiments.

In one or more embodiments, the user may select to drag an edge to resize visualizations and change the layout. FIG. 18 depicts a flowchart for responding to an edge dragging event, in accordance with example embodiments.

At Block 1802, an edge dragging event is detected. The event is of a user selecting an edge and dragging the edge in the user interface. At Block 1804, a determination is made whether one or more parallel edges to the selected edge are identified. A parallel edge is an edge that is parallel with the selected edge. The parallel edge that is identified is also within a threshold distance in the perpendicular direction to the selected edge. Namely, on the parallel axis to the selected edge, the parallel edge may be any distance from the selected edge. On the perpendicular axis to the selected edge, the parallel edge is a threshold distance to the selected edge. For example, the threshold distance may be within ten pixels. The threshold distance may be with respect to an initial location of the selected edge, a stop dragging location of the selected edge, or a location along the dragging path of the selected edge.

Further, at Block 1806, a determination is made whether the visualizations satisfy minimum size requirements. Each neighboring visualization to the edge may be defined with a parameter specifying the minimum size of the visualization. The parameter may be a configurable parameter. Thus, determining whether a visualization satisfies a minimum size requirement may be based on whether each visualization with the changes made would satisfy the minimum size requirements for the particular visualization.

If a parallel edge is identified and the minimum size requirements are satisfied, the flow may proceed to Block 1808, to set the edge dragging event to make the selected edge be collinear with the parallel edge based on the parallel edge being within a threshold distance (i.e., in the perpendicular direction) to the selected edge. Making the parallel edge and selected edge collinear gives a visual alignment to the visualizations making the dashboard more understandable without requiring the user to request the alignment. Making the edges collinear may include moving the parallel edge per the edge dragging event, snapping the selected edge to be colinear with the parallel edge or performing a combination of operations.

Continuing to Block 1810, if a parallel edge does not exist, the stop location of the edge dragging event is determined. The stop location is the end location of the edge dragging event. A determination is made whether the visualizations satisfy the minimum size requirement at Block 1812. Block 1812 may be performed in a same or similar manner to Block 1806 as discussed above. If in Block 1806 or 1812, a determination is made that the minimum size requirements are not satisfied (e.g., continuing to drag would violate the minimum size requirements), the edge is set such that the visualizations satisfy the minimum size requirements at Block 1814. The edge may be set to stop when a visualization is at a minimum size rather than reducing the size further. Although not shown, Block 1812 and Block 1806 may be continually performed during the edge dragging event. In such a scenario, the user may be prohibited or stopped from continuing or completing the edge dragging event once the minimum size of an adjacent visualization is reached. As another example, an alert may be presented to the user that the minimum size is reached.

Returning to Block 1812, if parallel edges do not exist and the stop location of the edge dragging event satisfies minimum size requirements, the flow may proceed to Block 1816. At Block 1816, the selected edge is set at the stop location of the edge dragging event.

When the selected edge is set, the cells of the neighboring visualizations to the selected edge are expanded or decreased according to the edge dragging event. Neighboring visualizations in the cells are resized based on the expanded or decreased cells.

Figure 19:
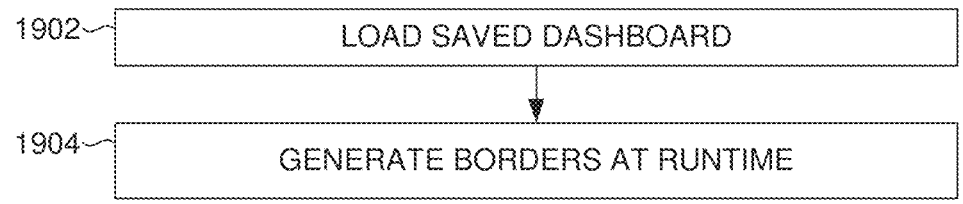
FIG. 19 depicts a flowchart for loading a dashboard, in accordance with example embodiments.

FIG. 19 depicts a flowchart for loading a dashboard, in accordance with example embodiments. At Block 1902, a saved dashboard is loaded. The saved dashboard is loaded from memory. For the visualizations, the dashboard specifies one or more queries that are executed initially, periodically, and/or continually to populate the visualizations with data. The execution may include the search head transmitting a request to the indexers and data stores. At Block 1904, as part of loading the dashboard, the borders are generated at runtime. The borders may be regenerated when the dashboard is updated as in FIG. 15 or 18, and when an end user selects to view the dashboard. Generating a border is described below and with reference to FIG. 20.

Figure 20:
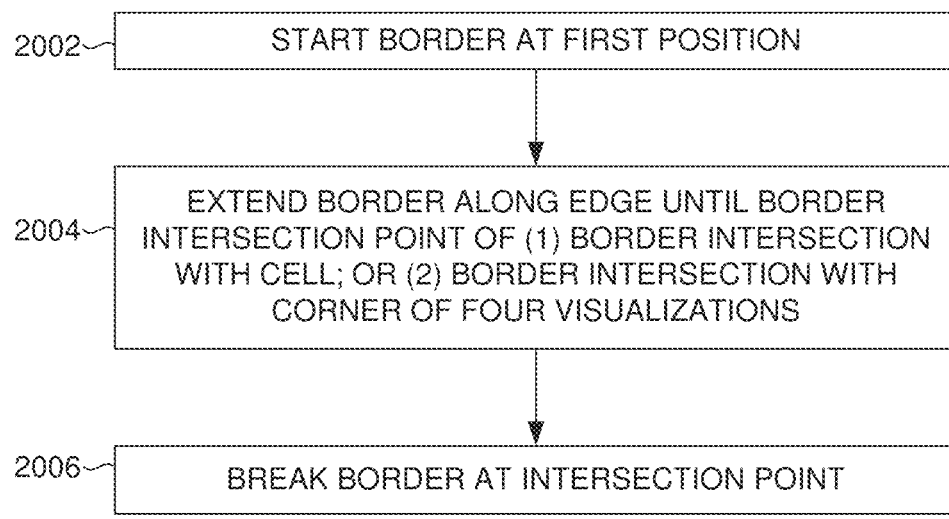
FIG. 20 depicts a flowchart for adding a border to a loaded dashboard, in accordance with example embodiments.

FIG. 20 depicts a flowchart for adding a border to a loaded dashboard, in accordance with example embodiments. At Block 2002, the border is started at a first position. An initial edge may be selected. For example, the initial edge may be the upper left most edge to get the border. The first position of the edge may be the upper left most position of the edge. At Block 2004, a border is extended along the edge, including collinear adjacent edges, until an intersection point. The intersection point may be one of the border intersecting a cell, such as intersecting the cell from a perpendicular direction, or the border intersecting with a corner of four visualizations. Namely, when the border hits a corner in which four cells meet, the corner may be referred to as an intersection point.

At Block 2006, the border is broken at the intersection point. Namely, the stop position of the border is at the intersection point or within a predefined number of pixels to the intersection point to show the break.

FIG. 20 may be performed for each edge having a border. In some embodiments, only internal edges have a border. In other embodiments, other edges may have a border.

Figure 21A:
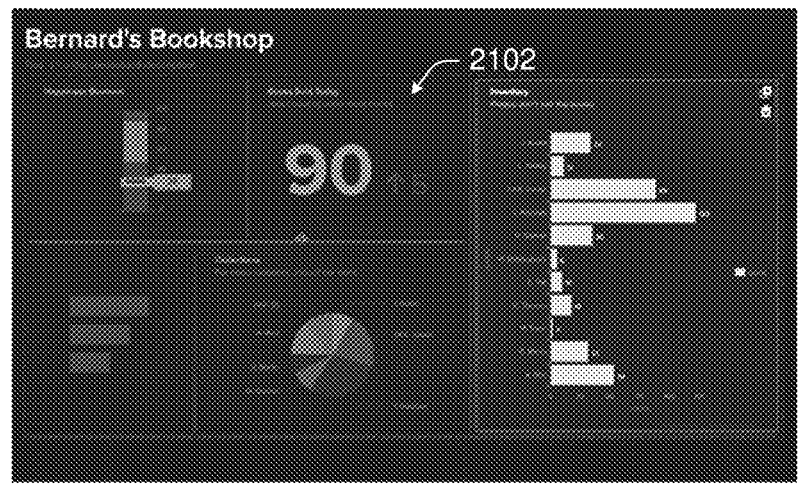
FIG. 21A depicts an example editor interface for moving a visualization, in accordance with example embodiments.
Figure 21B:
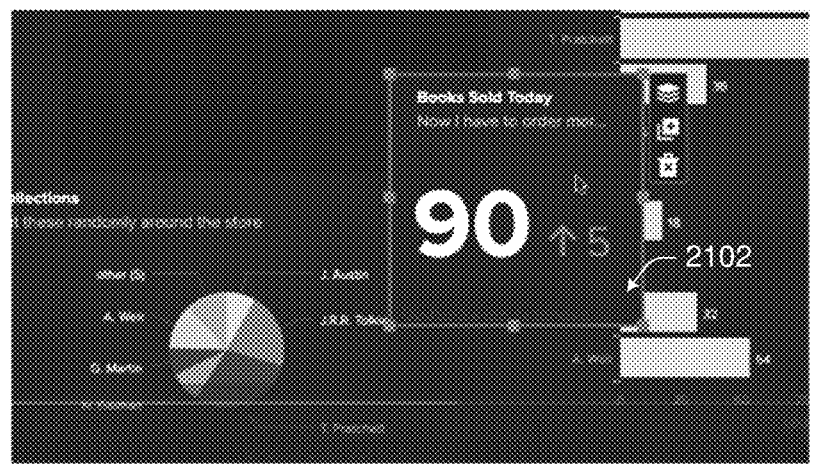
FIG. 21B depicts an example editor interface showing a moved visualization, in accordance with example embodiments.

The following examples of dashboards and updating a dashboard is for explanatory purposes only. FIG. 21A and FIG. 21B depict an example editor interface for moving a visualization, in accordance with example embodiments. In particular, FIG. 21A and FIG. 21B show the example dashboard 2100 when a visualization is being moved in accordance with one or more embodiments. As shown in FIG. 21A, a user may select the visualization 2102. The user may drag the selected visualization 2102 as shown in FIG. 21B. During the dragging, the selected visualization 2102 may be shown as an overlay on the example dashboard 2100. Namely, the editor may have a layering view of the visualization that is selected to show that the selected visualization is being moved.

Figure 22A:
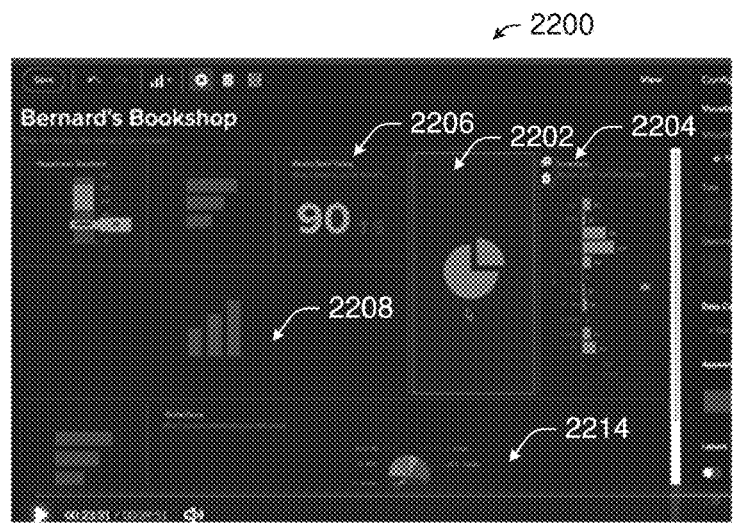
FIG. 22A depicts an example editor interface showing an initial location of a set of visualizations, in accordance with example embodiments.
Figure 22B:
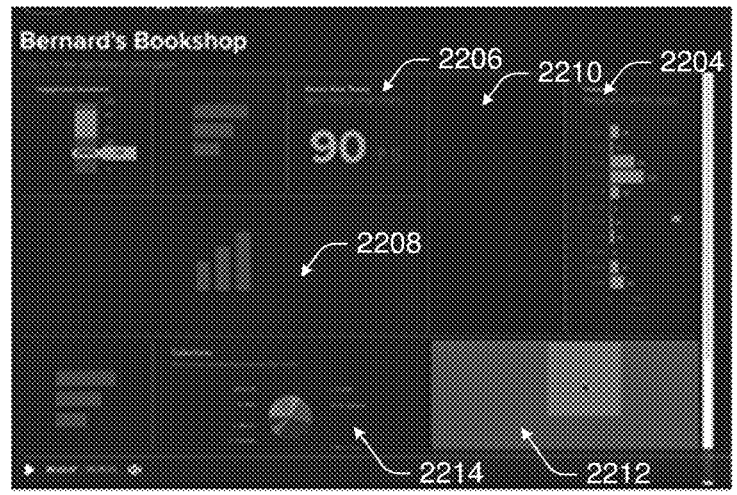
FIG. 22B depicts an example editor interface with a preview view, in accordance with example embodiments.
Figure 22C:
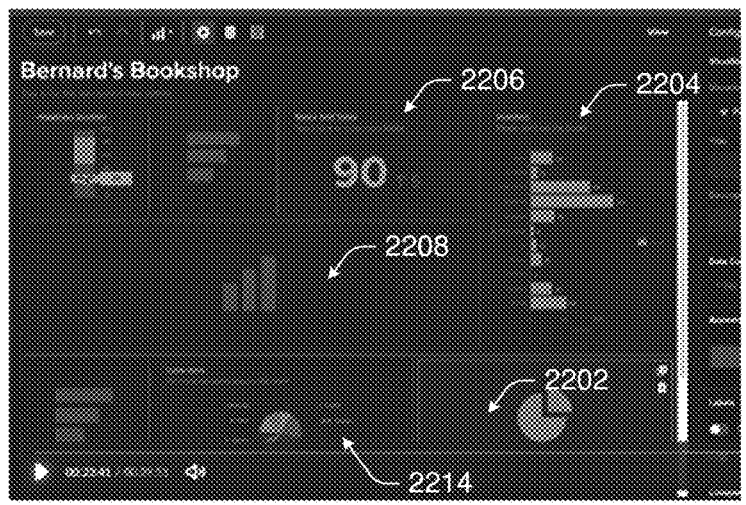
FIG. 22C depicts an example editor interface with a moved visualization from the initial location, in accordance with example embodiments.

FIGS. 22A-C show an example of moving a selected visualization in accordance with one or more embodiments. FIG. 22A depicts an example editor interface showing an example dashboard 2200. The user selects visualization 2202. Visualizations 2206, 2204, and 2208 are adjacent visualizations.

FIG. 22B depicts an example editor interface with a preview view, in accordance with example embodiments. From FIG. 22A, the user moves visualization 2202 to drop zone location 2212 in FIG. 22B. Cell 2210 is changed to an empty cell and new cell 2212 is created. The new cell is created by reducing the size of the neighboring visualization 2214 from the size shown in FIG. 22A. Further, a placeholder, such as a box is created in the drop zone location of the new cell 2212.

When an event is received indicating the user's acceptance of the location, the dashboard shown in FIG. 22C is displayed. As shown in FIG. 22C, the selected visualization is in cell 2202. Neighboring visualization 2214 remains the same size as in FIG. 22B. As shown through comparison of FIG. 22A with FIG. 22C, adjacent visualizations 2206, 2204, 2208 are expanded in size based on the removal of the original cell for visualization 2202 and the increase in size of the adjacent cells.

Figure 23A:
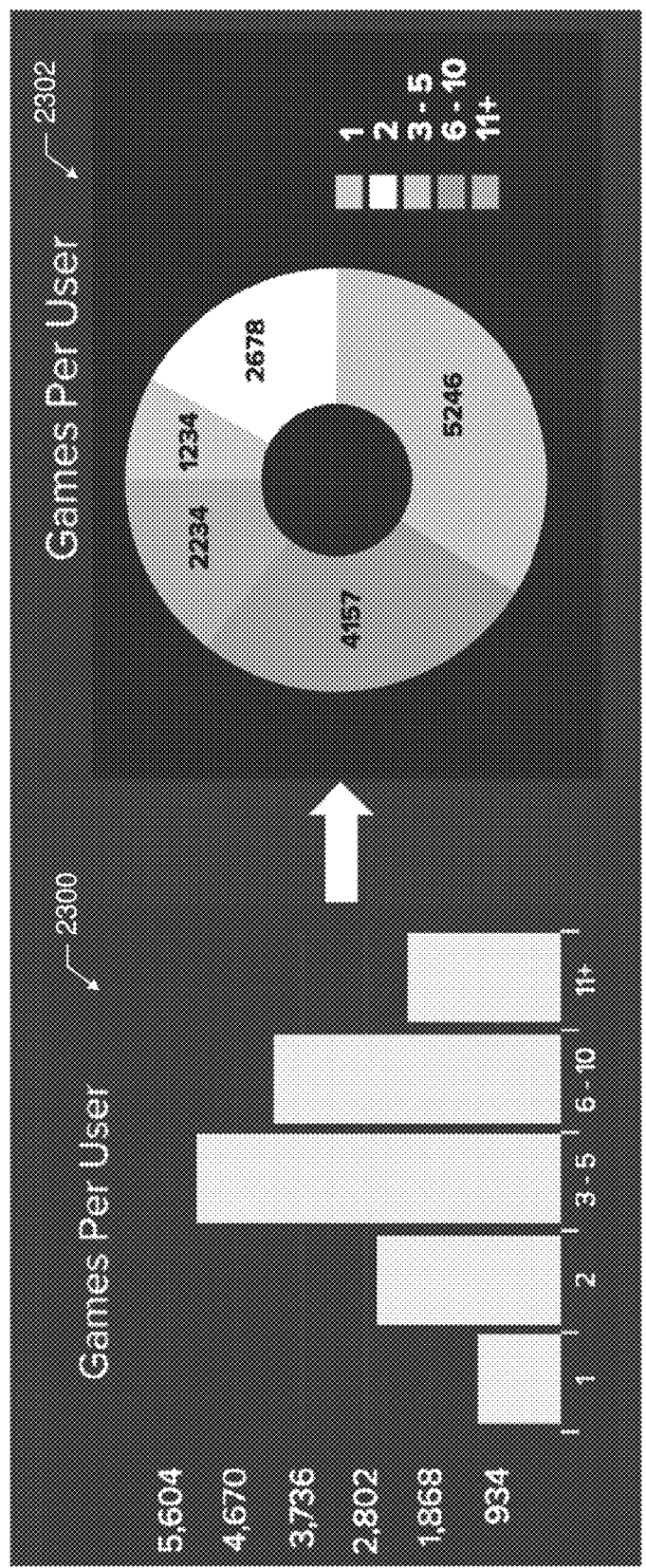
FIG. 23A depicts an example of a changing visualization type, in accordance with example embodiments.
Figure 23B:
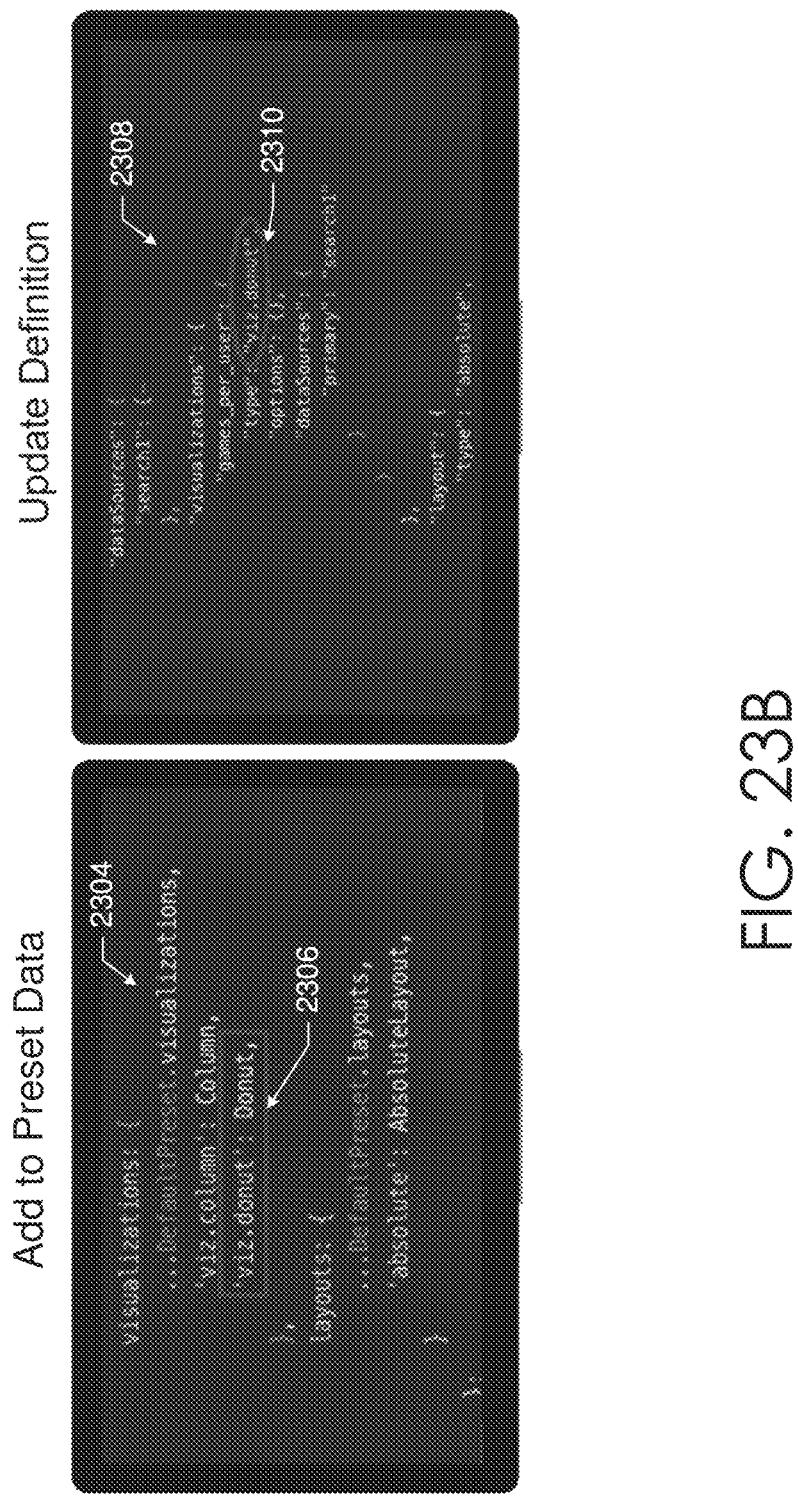
FIG. 23B depicts an example of an interface to change visualization type, in accordance with example embodiments.

As discussed above, by changing the definition and preset data, the visualization type may change. FIG. 23A and FIG. 23B show a diagram for changing a visualization type. FIG. 23A depicts a user side example of the visualization type change. As shown in FIG. 23A, a chart is changed from a column chart 2300 to a donut chart 2302, while the underlying data represented in the chart remains the same. To perform the change, visualization type code for a donut type visualization is added. Further, as shown in FIG. 23B, the preset data 2304 is updated to relate a donut type identifier to the visualization type code for the donut type visualization 2306. The definition 2308 is updated to reference the preset data 2310 for the donut type visualization. Additional options may be added to modify the color scheme and add labels. Although not shown, the additional options may be passed as parameters via the preset data to the visualization type code. Thus, the user may easily modify the dashboard with both the visualization type presented and the layout.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from GUIs, interactive voice response, command line interfaces, and other suitable interfaces.

Further, processing of the various components of the illustrated systems can be distributed across multiple machines, networks, and other computing resources. In certain embodiments, one or more of the components of the data intake and query system 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., search head 210, indexers 206, etc.) and by providing access to the system to end users via a network.

When implemented as a cloud-based service, various components of the data intake and query system 108 can be implemented using containerization or operating-system-level virtualization, or other virtualization technique. For example, one or more components of the data intake and query system 108 (e.g., search head 210, indexers 206, etc.) can be implemented as separate software containers or container instances. Each container instance can have certain resources (e.g., memory, processor, etc.) of the underlying host computing system assigned to it but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
    obtaining a definition of a visualization in a dashboard;
    extracting, from the definition, a dataset, a color encoding, and a visualization type;
    obtaining a preset data matching the visualization type;
    extracting, from the preset data, a visualization type code defining a rendering process to render the visualization type;
    rendering data from the dataset into the visualization according to the visualization type code, and the color encoding;
    detecting an edge dragging event of a selected edge in the dashboard, the edge dragging event comprising dragging the selected edge along an axis perpendicular to the edge;
    identifying a parallel edge to the selected edge, the parallel edge within a threshold distance to the selected edge along the axis;
    setting the edge dragging event to make the selected edge be collinear with the parallel edge based on the parallel edge being within the threshold distance to the selected edge;
    stopping the edge dragging event at a stop location to generate an updated dashboard; and
    presenting the updated dashboard.

2. The computer implemented method of claim 1, further comprising:
- detecting that a drop zone location for a selected visualization to be on a cell of a neighboring visualization of the at least one neighboring visualization;
- partitioning the cell into a plurality of quadrants;
- detecting a quadrant of the plurality of quadrants having the drop zone location;
- positioning the selected visualization over a first half of the cell, the first half defined by the quadrant; and
- resizing the neighboring visualization to be over a second half of the cell.

3. The computer implemented method of claim 1, further comprising:
- detecting an initial drop zone location of a selected visualization being located on a cell of a neighboring visualization of the at least one neighboring visualization;
- partitioning the cell into a plurality of quadrants;
- detecting a first quadrant of the plurality of quadrants having the initial drop zone location; and
- generating a preview of the selected visualization on the cell at the first quadrant, wherein generating the preview comprises:
  - positioning a placeholder over a first half of the cell, the first half defined by the first quadrant,
  - resizing the neighboring visualization to be over a second half of the cell to obtain a first resized neighboring visualization, and
  - displaying the placeholder and the first resized neighboring visualization on the cell in the dashboard.

4. The computer implemented method of claim 1, further comprising:
- detecting a hover event of a selected visualization at a location, and
- responsive to the hover event, displaying a placeholder of the selected visualization at the location.

5. The computer implemented method of claim 1, further comprising:
- detecting that a drop zone location for a selected visualization is on an edge between at least two neighboring visualizations;
- resizing each of the at least two neighboring visualizations based on the drop zone location to create a cell for the selected visualization; and
- adding the selected visualization to the cell.

6. The computer implemented method of claim 1, further comprising:
- detecting a drop zone location of a selected visualization within the dashboard;
- identifying at least one neighboring visualization to the drop zone location, wherein the at least one neighboring visualization shares an edge with the drop zone location;
- sizing the selected visualization for the drop zone location;
- resizing the at least one neighboring visualization based on the selected visualization being added to the drop zone location; and
- adding the selected visualization to the drop zone location to further generate the updated dashboard.

7. The computer implemented method of claim 1, further comprising:
- responsive to the edge dragging event, determining a minimum size threshold of a target visualization that is adjacent to the selected edge, and
- setting the stop location such that a size of the target visualization complies with the minimum size threshold.

8. The computer implemented method of claim 1, wherein the at least one neighboring visualization spans a plurality of rows.

9. The computer implemented method of claim 1, further comprising:
- determining each adjacent visualization to a selected visualization, each adjacent visualization being adjacent to a selected visualization prior to a move to a drop zone location of the selected visualization; and
- increasing a size of one or more of the adjacent visualizations to fill a space created by the selected visualization with the move.

10. The computer implemented method of claim 1, further comprising:
- saving, with the dashboard, a plurality of locations of a plurality of visualizations to create a saved dashboard, wherein the saved dashboard omits a plurality of borders;
- loading the saved dashboard at a runtime; and
- generating the plurality of borders between the plurality of visualizations at the runtime.

11. The computer implemented method of claim 1, further comprising:
- generating a plurality of borders between a plurality of visualizations by:
  - starting at a first position of the dashboard, extending a border between a first subset of the plurality of visualizations until the border intersects a visualization.

12. The computer implemented method of claim 1, further comprising:
- generating a plurality of borders between a plurality of visualizations by:
  - starting at a first position of the dashboard, extending a border between a first subset of the plurality of visualizations until the border intersects a corner between four visualizations, and
  - breaking the border at the corner.

13. The computer implemented method of claim 1, further comprising:
- extracting, from the definition, a label set and a location identifier,
- wherein the rendering comprises adding the visualization type and the label set to a new cell at a location within the new cell defined by the location identifier, the new cell defined by the location identifier.

14. A computer system comprising:
- a computer processor; and
- instructions, stored in memory, for causing the computer processor to perform operations, the operations comprising:
  - obtaining a definition of a visualization in a dashboard,
  - extracting, from the definition, a dataset, a color encoding, and a visualization type;
  - obtaining a preset data matching the visualization type,
  - extracting, from the preset data, a visualization type code defining a rendering process to render the visualization type,
  - rendering data from the dataset into the visualization according to the visualization type code, and the color encoding, detecting an edge dragging event of a selected edge in the dashboard, the edge dragging event comprising dragging the selected edge along an axis perpendicular to the edge, identifying a parallel edge to the selected edge, the parallel edge within a threshold distance to the selected edge along the axis, setting the edge dragging event to make the selected edge be collinear with the parallel edge based on the parallel edge being within the threshold distance to the selected edge, stopping the edge dragging event at a stop location to generate an updated dashboard, and presenting the updated dashboard.

15. The computer system of claim 14, the operations further comprising:

detecting a hover event of a selected visualization at a location, and responsive to the hover event, displaying a placeholder of the selected visualization at the location.

16. The computer system of claim 14, the operations further comprising:

responsive to the edge dragging event, determining a minimum size threshold of a target visualization that is adjacent to the selected edge, and setting the stop location such that a size of the target visualization complies with the minimum size threshold.

17. The computer system of claim 14, the operations further comprising:

extracting, from the definition, a label set and a location identifier, wherein the rendering comprises adding the visualization type and the label set to a new cell at a location within the new cell defined by the location identifier, the new cell defined by the location identifier.

18. A non-transitory computer readable medium comprising computer readable program code for causing a computer system to perform operations, the operations comprising:

obtaining a definition of a visualization in a dashboard;

extracting, from the definition, a dataset, a color encoding, and a visualization type;

obtaining a preset data matching the visualization type;

extracting, from the preset data, a visualization type code defining a rendering process to render the visualization type;

rendering data from the dataset into the visualization according to the visualization type code, and the color encoding;

detecting an edge dragging event of a selected edge in the dashboard, the edge dragging event comprising dragging the selected edge along an axis perpendicular to the edge;

identifying a parallel edge to the selected edge, the parallel edge within a threshold distance to the selected edge along the axis;

setting the edge dragging event to make the selected edge be collinear with the parallel edge based on the parallel edge being within the threshold distance to the selected edge;

stopping the edge dragging event at a stop location to generate an updated dashboard; and presenting the updated dashboard.

19. The non-transitory computer readable medium of claim 18, the operations further comprising:

responsive to the edge dragging event, determining a minimum size threshold of a target visualization that is adjacent to the selected edge, and setting the stop location such that a size of the target visualization complies with the minimum size threshold.

* * * * *